US012482121B2

United States Patent
Ikebuchi et al.

(10) Patent No.: US 12,482,121 B2
(45) Date of Patent: Nov. 25, 2025

(54) THREE-DIMENSIONAL MEASUREMENT DEVICE

(71) Applicant: Keyence Corporation, Osaka (JP)

(72) Inventors: Masayasu Ikebuchi, Osaka (JP); Hitoshi Sakai, Osaka (JP); Shuji Shimonaka, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 108 days.

(21) Appl. No.: 18/398,259

(22) Filed: Dec. 28, 2023

(65) Prior Publication Data

US 2024/0265560 A1 Aug. 8, 2024

(30) Foreign Application Priority Data

Feb. 7, 2023 (JP) .................. 2023-016766

(51) Int. Cl.
*G06T 7/55* (2017.01)
*G01B 11/25* (2006.01)
(Continued)

(52) U.S. Cl.
CPC ............... *G06T 7/55* (2017.01); *G01B 11/25* (2013.01); *G06T 7/13* (2017.01); *G06T 7/521* (2017.01);
(Continued)

(58) Field of Classification Search
None
See application file for complete search history.

(56) References Cited

U.S. PATENT DOCUMENTS 9,551,566 B2   1/2017   Wakai
9,557,159 B2   1/2017   Ikebuchi
(Continued)

FOREIGN PATENT DOCUMENTS

CN   112959329 A  *  6/2021  ............ B25J 9/1602
EP   3693698 A1  *  8/2020  ............ G01C 11/02
(Continued)

OTHER PUBLICATIONS

STIC Provided translation of FOR Reference N (Wang, et al. (CN-112959329-A referred to as "Wang" throughout)) (Year: 2021).*
(Continued)

*Primary Examiner* — Tyler W. Sullivan
(74) *Attorney, Agent, or Firm* — Kilyk & Bowersox, P.L.L.C.

(57) ABSTRACT

High-speed scanning is implemented by a three-dimensional scanner. A three-dimensional measurement device includes: a three-dimensional scanner including a scanner image processing unit that generates first measurement information by processing a first image including pattern light; an imaging unit including a camera image processing unit that generates second measurement information by processing a second image including a self-luminous marker provided in the three-dimensional scanner; and a three-dimensional data generation mechanism. The three-dimensional data generation mechanism receives the first measurement information and the second measurement information, and generates a point cloud indicating a three-dimensional shape of a measurement target based on the received first measurement information and second measurement information, and identification information.

11 Claims, 11 Drawing Sheets

(51) Int. Cl.
    *G06T 7/13* (2017.01)
    *G06T 7/521* (2017.01)
    *G06T 7/73* (2017.01)
    *H04N 23/56* (2023.01)

(52) U.S. Cl.
    CPC ...... *G06T 7/74* (2017.01); *G06T 2207/10028* (2013.01); *G06T 2207/30204* (2013.01); *G06T 2207/30244* (2013.01); *H04N 23/56* (2023.01)

(56) References Cited

U.S. PATENT DOCUMENTS

| | | | |
|---|---|---|---|
| 9,778,023 B2 | 10/2017 | Osaki et al. | |
| 9,885,564 B2 | 2/2018 | Osaki et al. | |
| 9,964,402 B2* | 5/2018 | Tohme | G01B 11/2545 |
| 10,267,620 B2 | 4/2019 | Ikebuchi | |
| 10,619,994 B2 | 4/2020 | Futami | |
| 10,739,126 B2 | 8/2020 | Ikebuchi | |
| 10,817,160 B2 | 10/2020 | Ikebuchi | |
| 10,837,757 B1* | 11/2020 | Ikebuchi | G01B 11/007 |
| 11,786,206 B2* | 10/2023 | Steines | A61B 6/462 378/91 |
| 2016/0313114 A1* | 10/2016 | Tohme | H04N 13/257 |
| 2022/0412721 A1 | 12/2022 | Miyaki et al. | |
| 2024/0263939 A1* | 8/2024 | Miyaki | G01B 11/254 |

FOREIGN PATENT DOCUMENTS

| | | | |
|---|---|---|---|
| JP | 202020699 A | 2/2020 | |
| WO | WO-2016025358 A1 * | 2/2016 | G01S 17/86 |

OTHER PUBLICATIONS

STIC Provided translation of FOR Reference O (Urlich, et al. (EP-3693698-A1 referred to as "Urlich" throughout)) (Year: 2020).*

U.S. Appl. No. 18/398,269, filed Dec. 28, 2023 (63 pages).

* cited by examiner

THREE-DIMENSIONAL MEASUREMENT DEVICE

CROSS-REFERENCE TO RELATED APPLICATIONS

The present application claims foreign priority based on Japanese Patent Application No. 2023-016766, filed Feb. 7, 2023, the contents of which are incorporated herein by reference.

BACKGROUND OF THE INVENTION

1. Technical Field

The disclosure relates to a three-dimensional measurement device including an imaging unit that captures an image of a three-dimensional scanner having a self-luminous marker.

2. Description of the Related Art

For example, JP 2020-20699 A discloses that three-dimensional coordinate measurement of a measurement target is performed using a contact-type probe having a contact part to be brought into contact with a desired part of the measurement target.

In JP 2020-20699 A, images of a plurality of markers provided in the contact-type probe can be captured by an imaging unit installed at a position distant from the contact-type probe, and three-dimensional coordinates of a contact position of the contact-type probe can be calculated based on a marker image generated by the imaging unit.

Meanwhile, coordinates can be measured only at a part in contact with the probe since the probe is of a contact type in a device in JP 2020-20699 A. In this regard, if a three-dimensional scanner of a non-contact type is used, measurement of a wider range, that is, scanning of a wide range of the measurement target becomes possible. However, in order to implement the scanning of a wider range at a higher speed than the device in JP 2020-20699 A, it is necessary to transmit an image acquired by the three-dimensional scanner from the three-dimensional scanner to a processing unit at a high frame rate.

However, a data amount of the image acquired by the three-dimensional scanner is much larger than a data amount indicating a position of the point as in JP 2020-20699 A, and there is a case where it is difficult to transmit such image data having a large data amount to the processing unit at a high frame rate due to a restriction of a communication band.

SUMMARY OF THE INVENTION

The disclosure has been made in view of such a point, and an object thereof is to implement high-speed scanning by a three-dimensional scanner.

In order to achieve the above object, according to one embodiment of the disclosure, a three-dimensional measurement device that measures a three-dimensional shape of a measurement target can be assumed. The three-dimensional measurement device includes: a three-dimensional scanner including a scanner light source that emits pattern light, a scanner imaging part that captures the pattern light emitted by the scanner light source to generate a first image including the pattern light, a scanner image processing unit that processes the first image generated by the scanner imaging part to generate first measurement information, and a plurality of self-luminous markers; an imaging unit including a movable imaging part that moves a field of view to make the three-dimensional scanner be within the field of view, and captures the self-luminous markers for measuring a position and a posture of the three-dimensional scanner to generate a second image including the self-luminous markers, and a camera image processing unit that processes the second image generated by the movable imaging part to generate second measurement information; a synchronization mechanism that generates identification information for identifying a synchronous execution timing based on a measurement instruction; a measurement control part that synchronizes the emission of the pattern light from the scanner light source, the imaging by the scanner imaging part, light emission of the self-luminous markers, and the imaging by the movable imaging part in response to the generation of the identification information by the synchronization mechanism; and a three-dimensional data generation mechanism that generates a point cloud indicating the three-dimensional shape of the measurement target based on the first measurement information generated by the scanner image processing unit and the second measurement information generated by the camera image processing unit. The three-dimensional scanner further includes a first transmission unit that transmits the first measurement information generated by the scanner image processing unit and identification information corresponding to the first measurement information and generated by the synchronization mechanism to be tied to each other, Further, the imaging unit further includes a second transmission unit that transmits the second measurement information generated by the camera image processing unit and identification information corresponding to the second measurement information and generated by the synchronization mechanism to be tied to each other. The three-dimensional data generation mechanism can receive the first measurement information generated by the scanner image processing unit, the identification information corresponding to the first measurement information, the second measurement information generated by the camera image processing unit, and the identification information corresponding to the second measurement information, and generate the point cloud indicating the three-dimensional shape of the measurement target based on the received first measurement information, identification information corresponding to the first measurement information, second measurement information, and identification information corresponding to the second measurement information.

According to this configuration, when the identification information is generated based on the measurement instruction, the scanner light source emits the pattern light and the scanner imaging part generates the first image including the pattern light, and the self-luminous markers emit light and the movable imaging part generates the second image including the self-luminous markers. The first measurement information generated by processing the first image, generated by the scanner imaging part, is tied to the identification information corresponding to the first measurement information and received by the three-dimensional data generation mechanism. Further, the second measurement information generated by processing the second image, generated by the movable imaging part, is tied to the identification information corresponding to the second measurement information and received by the three-dimensional data generation mechanism. As a result, the three-dimensional data generation mechanism can generate the point cloud indicating the three-dimensional shape of the measurement target based on the first measurement information and the second measurement information without erroneously combining the first measurement information and the second measurement information acquired at the same timing. That is, it is sufficient to transmit the first measurement information obtained by processing the first image and the second measurement information obtained by processing the second image to the three-dimensional data generation mechanism, and thus, a data amount is reduced as compared with a case where image data is directly transmitted, and transmission at a high frame rate becomes possible.

Further, the imaging unit may further include a fixed imaging part that captures the movable imaging part. The measurement control part synchronizes the imaging by the fixed imaging part with the imaging by the movable imaging part in response to the generation of the identification information by the synchronization mechanism, so that the measurement control part can acquire a position and a posture of the movable imaging part at the same timing as the imaging of the second image including the self-luminous markers by the movable imaging part.

For example, the movable imaging part may be provided with a plurality of markers moving as the field of view of the movable imaging part moves. In this case, the fixed imaging part captures images of the plurality of markers arranged in the movable imaging part to generate a third image including the markers, and the camera image processing unit processes the third image generated by the fixed imaging part to generate third measurement information. The three-dimensional data generation mechanism can generate the point cloud indicating the three-dimensional shape of the measurement target based on the first measurement information generated by the scanner image processing unit, the second measurement information generated by the camera image processing unit, and the third measurement information generated by the camera image processing unit.

That is, it is possible to generate an accurate point cloud by determining the position and posture of the three-dimensional scanner with respect to the imaging unit based on the second image including the self-luminous markers, determining the position and posture of the movable imaging part with respect to the fixed imaging part based on the images captured by the fixed imaging part, and determining a position and a posture of the three-dimensional scanner with respect to the fixed imaging part from these two positions and postures.

The scanner image processing unit can perform edge extraction processing on the first image to generate edge data as the first measurement information. That is, it is difficult to transmit the first image at a high frame rate since the first image has a large data amount. On the other hand, if the three-dimensional scanner executes even generation of three-dimensional point cloud data, a size of hardware is increased, which may be disadvantageous in terms of the size and power consumption of the three-dimensional scanner. Thus, when the scanner image processing unit executes the edge data extraction processing, it is possible to avoid the increase in size of the three-dimensional scanner while implementing transmission at a high frame rate, thereby achieving well-balanced design.

Further, the camera image processing unit may perform processing of extracting a center of each of the self-luminous markers on the second image to generate center position information of each of the self-luminous markers as the second measurement information. In this case, the camera image processing unit can generate position and posture information of each of the self-luminous markers with respect to the movable imaging part as the second measurement information based on the obtained center position information of each of the self-luminous markers. That is, since the camera image processing unit generates the position and posture information of each of the self-luminous markers, transmission at a high frame rate can be implemented as compared with a case of transmitting the second image.

The camera image processing unit may include, for example, a graphics processing unit (GPU), a field programmable gate array (FPGA), and a digital signal processor (DSP) as an image processing circuit.

The three-dimensional measurement device may include: a memory that sequentially accumulates the first measurement information generated by the scanner image processing unit; and an association unit that associates the first measurement information and the second measurement information based on the identification information. The association unit can specify the first measurement information having the identification information tied to the second measurement information from among a plurality of pieces of the first measurement information accumulated in the memory, and associate the specified first measurement information with the second measurement information. Further, the memory may be provided in the imaging unit and sequentially accumulate the first measurement information transmitted from the first transmission unit. In this case, the second transmission unit can transmit the first measurement information and the second measurement information associated by the association unit to the three-dimensional data generation mechanism.

As described above, the first measurement information obtained by processing the first image including the pattern light and generated by the scanner imaging part, and the second measurement information obtained by processing the second image including the self-luminous markers and generated by the movable imaging part are transmitted to the three-dimensional data generation mechanism such that the three-dimensional data generation mechanism generates the point cloud indicating the three-dimensional shape of the measurement target. Thus, the transmission at a high frame rate is possible, and the high-speed scanning can be implemented.

DETAILED DESCRIPTION

Hereinafter, an embodiment of the invention will be described in detail with reference to the drawings. Note that the following preferred embodiment is described merely as an example in essence, and there is no intention to limit the invention, its application, or its use.

Figure 1:
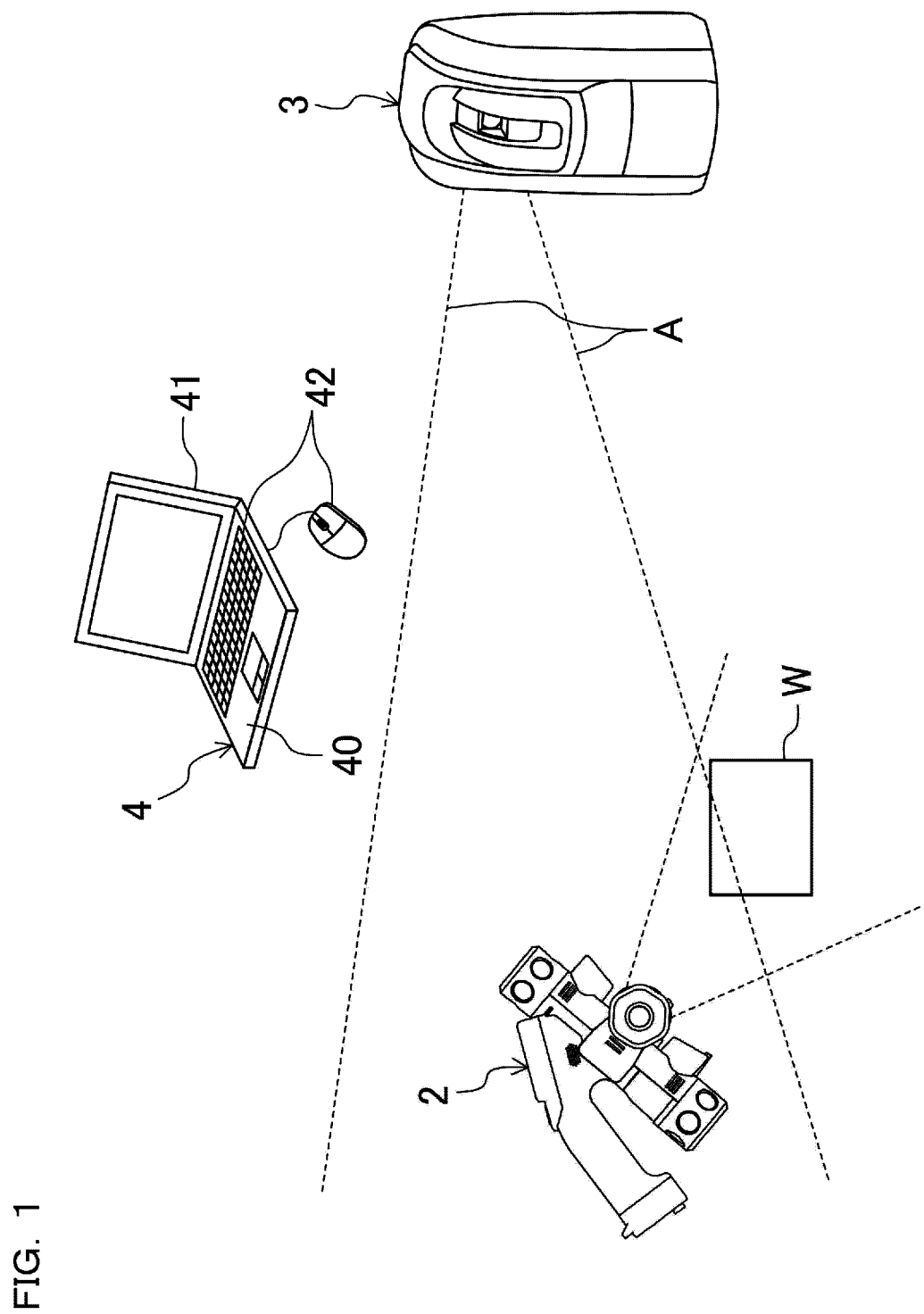
FIG. 1 is a view illustrating an overall configuration of a three-dimensional measurement device according to an embodiment of the invention.

FIG. 1 is a view illustrating an overall configuration of a three-dimensional measurement device 1 according to the embodiment of the invention. The three-dimensional measurement device 1 is a shape measuring instrument that measures a three-dimensional shape and three-dimensional coordinates of a measurement target W without coming into contact with the measurement target W, and includes a three-dimensional scanner 2 having a plurality of self-luminous markers, an imaging unit 3 that captures images of the plurality of self-luminous markers provided in the three-dimensional scanner 2; a processing unit 4 that measures a three-dimensional shape and three-dimensional coordinates of the measurement target W based on a marker image generated by the imaging unit 3 and a bright line image generated by the three-dimensional scanner 2. The three-dimensional scanner 2 is provided separately from the imaging unit 3 and the processing unit 4, and a measurement worker can bring the three-dimensional scanner 2 to the vicinity of the measurement target W located at a place distant from the imaging unit 3 and the processing unit 4 and cause the three-dimensional scanner 2 to generate the bright line image.

(Configuration of Imaging Unit 3)

Figure 2:
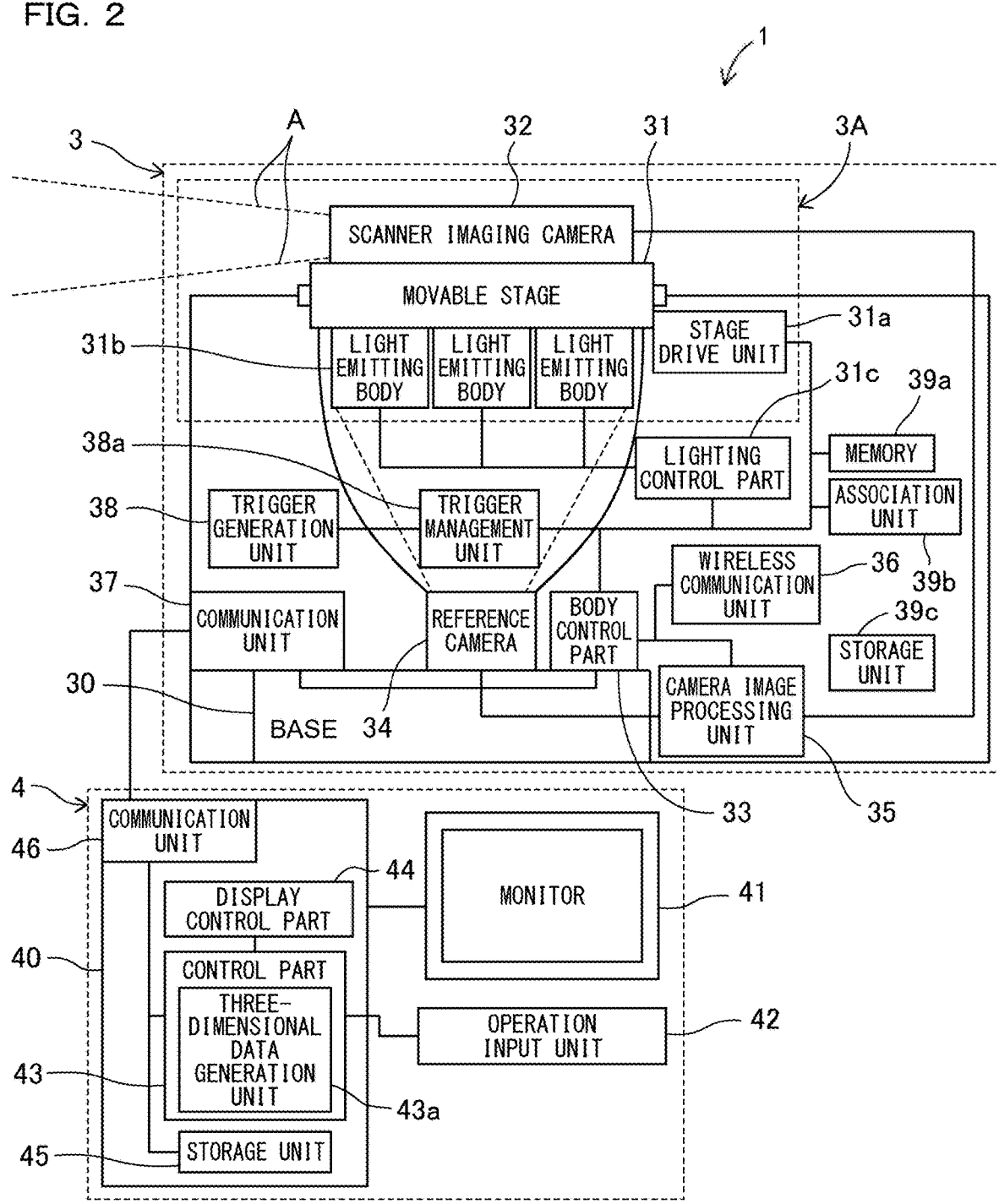
FIG. 2 is a block diagram of an imaging unit and a processing unit.
Figure 3:
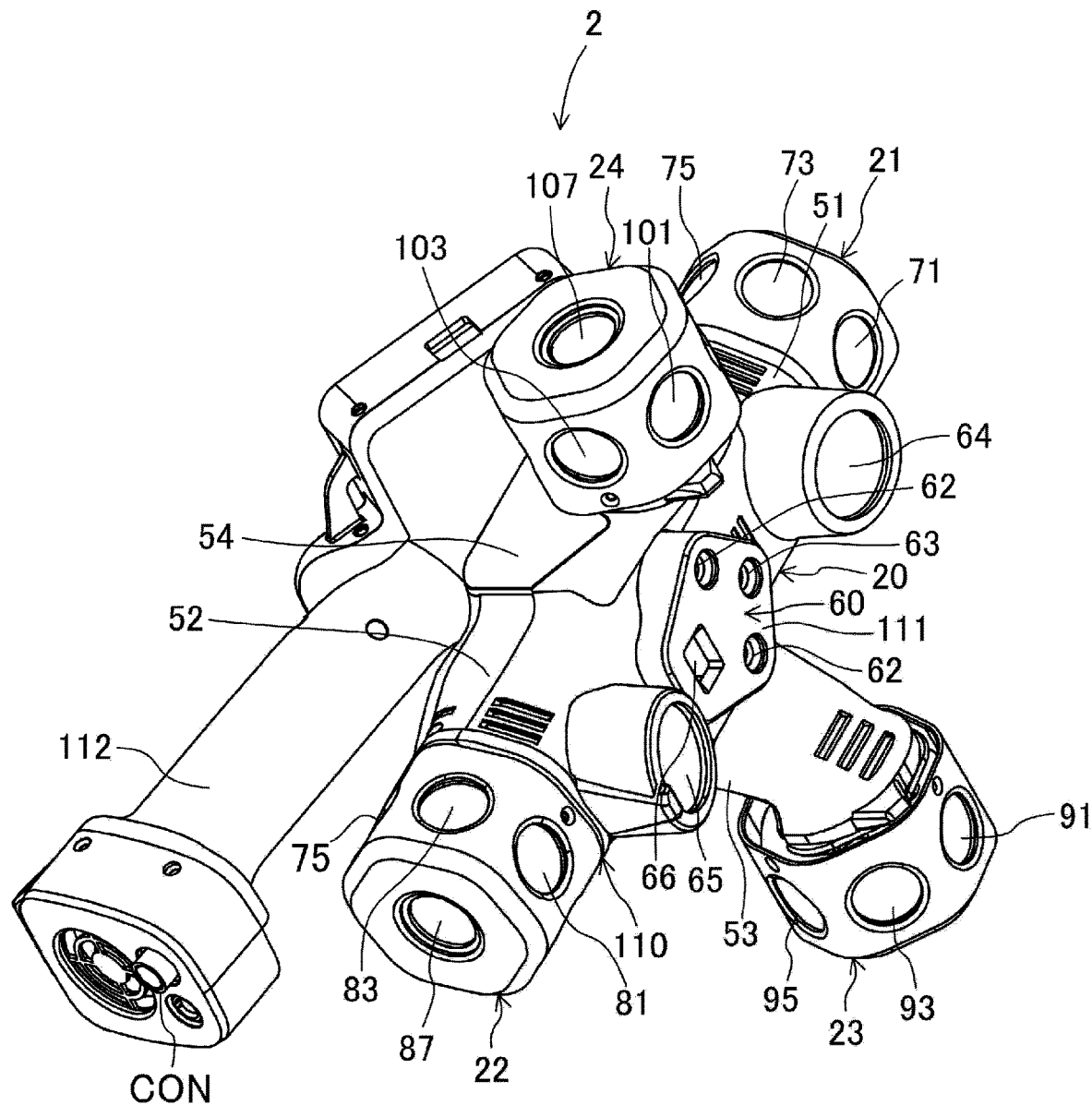
FIG. 3 is a perspective view of a three-dimensional scanner as viewed from below.
Figure 4:
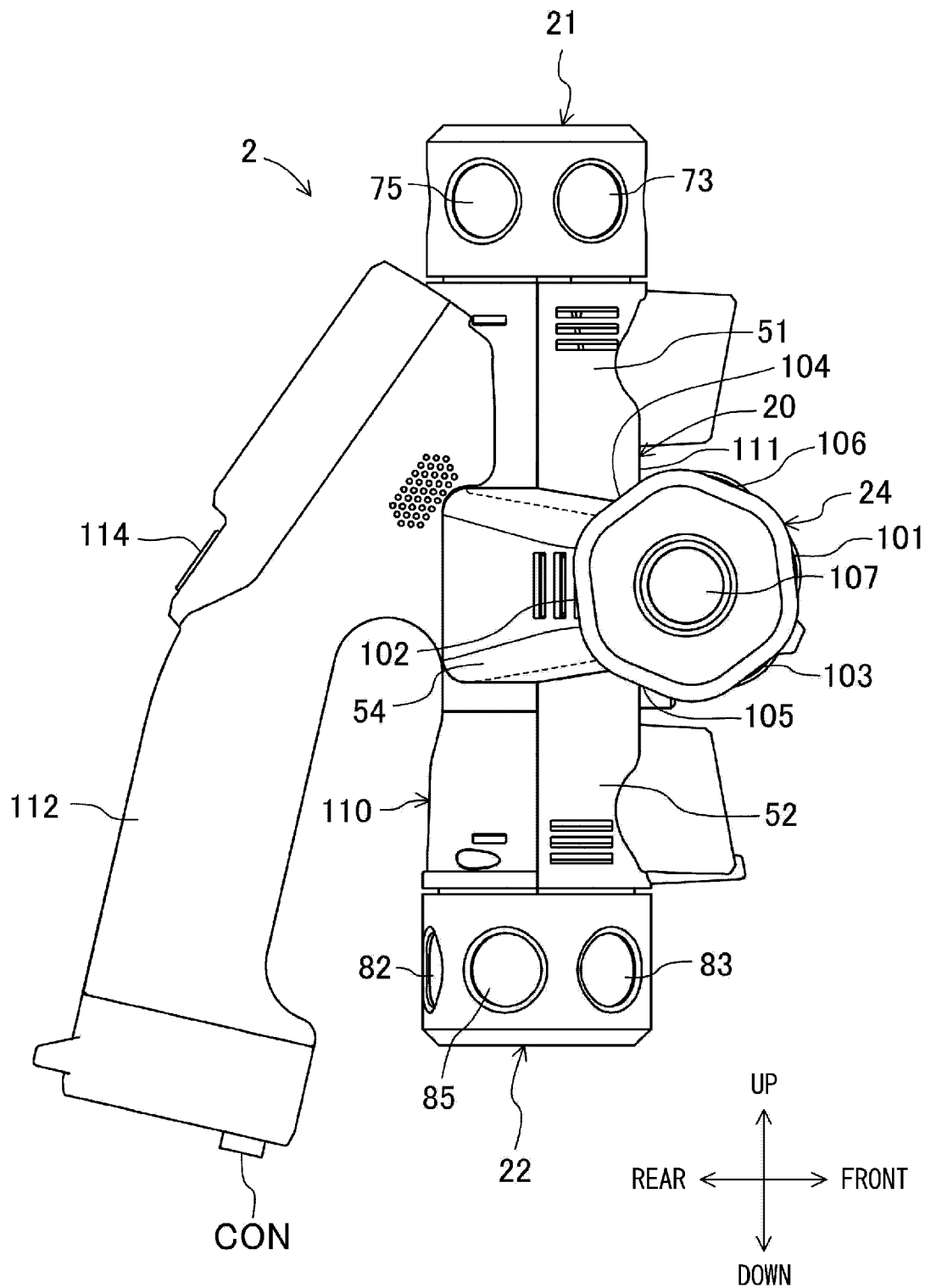
FIG. 4 is a right side view of the three-dimensional scanner.

The imaging unit 3 is a unit that captures images of a plurality of self-luminous markers (which will be described later) provided on the three-dimensional scanner 2 to generate a marker image (corresponding to a second image of the invention) including the plurality of self-luminous markers. As illustrated in FIG. 2, the imaging unit 3 includes a base 30 and a movable imaging part 3A that moves a field of view such that the three-dimensional scanner 2 is within the field of view, and captures images of self-luminous markers to measure a position and a posture of the three-dimensional scanner 2 to generate a marker image including the self-luminous markers. The movable imaging part 3A includes a movable stage 31 supported by the base 30 and a scanner imaging camera 32 fixed to an upper portion of the movable stage 31. The movable stage 31 includes a stage drive unit 31a. The stage drive unit 31a incorporates an actuator such as a motor, and is configured to rotate the movable stage 31 about a left-right axis as well as a vertical axis. The scanner imaging camera 32 rotates about the vertical axis by rotating the movable stage 31 about the vertical axis, and the scanner imaging camera 32 rotates about the left-right axis by rotating the movable stage 31 about the left-right axis. As a result, the self-luminous marker can be tracked by moving a field of view (schematically indicated by broken lines A in FIGS. 1 and 2) of the scanner imaging camera 32 such that the three-dimensional scanner 2, that is, the plurality of self-luminous markers provided in the three-dimensional scanner 2, enter the field of view of the scanner imaging camera 32. The stage drive unit 31a is controlled by a body control part 33 provided in the imaging unit 3.

In a lower portion of the movable stage 31, a plurality of light emitting bodies (corresponding to markers provided in the movable imaging part 3A of the invention) 31b are provided at predetermined intervals on a two-dimensional plane, and the light emitting bodies 31b are self-luminous markers switched between a turned-on state and a turned-off state by a lighting control part 31c. Further, arrangement information of each of the light emitting bodies 31b is stored in advance in a storage unit 39c of the imaging unit 3. Note that the marker provided in the movable imaging part 3A may be configured by a member serving as a mark other than the light emitting body 31b. The lighting control part 31c is controlled by the body control part 33. On the other hand, the base 30 is provided with a reference camera (corresponding to a fixed imaging part of the invention) 34 that captures an image of the movable imaging part 3A. The reference camera 34 captures an image of the light emitting body 31b turned on by the lighting control part 31c. The reference camera 34 captures images of a plurality of the light emitting bodies 31b provided in the movable imaging part 3A and generates an image (corresponding to a third image of the invention) including the light emitting bodies 31b.

The plurality of light emitting bodies 31b constitute reference markers of which images are captured by the reference camera 34. Specifically describing a configuration of a reference member including the plurality of light emitting bodies 31b, the reference member includes a light emitting substrate, a diffusion plate, and a glass plate arranged in order from the top to the bottom, and a periphery of a side of each of these is surrounded by a diffusion reflection sheet although not illustrated. On a lower surface of the light emitting substrate, a large number of the light emitting bodies 31b are mounted in an aligned state over the entire surface. Each of the light emitting bodies 31b is configured by, for example, an infrared light emitting diode (LED). As the light emitting bodies 31b, an LED that emits light of another wavelength may be used instead of the infrared LED, or other light emitting bodies such as a filament may be used. The light emitting bodies 31b are driven by the lighting control part 31c. The diffusion plate is, for example, a plate member made of resin, and transmits light generated from the plurality of light emitting bodies 31b downward while diffusing the light. The diffusion reflection sheet is, for example, a strip-shaped sheet member made of resin, and reflects the light, directed from the plurality of light emitting bodies 31b toward the side (outside) of the reference member, inward while diffusing the light. With the above configuration, the light emitted from the diffusion plate can be made uniform over the entire surface. The glass plate is plate glass, and is made of, for example, quartz glass or soda glass. Out of upper and lower surfaces of the glass plate, at least the lower surface is configured by a highly smoothed surface, and a thin film mask having a plurality of circular openings is provided on the lower surface. The thin film mask is, for example, a chromium mask formed on the lower surface of the glass plate by a sputtering method or a vapor deposition method. Each of the circular openings of this thin film mask defines a circular contour of the reference marker. As a result, it is possible to obtain an image having a prescribed shape without distortion regardless of an angle from which an image of the reference marker is captured. The reference marker that is a surface-emitting marker has any contour shape, and may be a quadrangle, a star, an ellipse, or the like.

With the above configuration, light is generated from the plurality of light emitting bodies 31b, diffused by the diffusion plate and the diffusion reflection sheet, and uniformly emitted over the entire surface. That is, a surface light source that uniformly emits light to the entire surface is obtained. Then, the light emitted from the surface light source is emitted below the reference member through each of the circular openings of the thin film mask. As a result, the surface-emitting reference marker having a clear contour is obtained. A plurality of the reference markers are arranged at equal intervals in a matrix on a lower surface (plane) of the reference member.

The imaging unit 3 is provided with a camera image processing unit 35. The camera image processing unit 35 includes an image processing circuit, and controls the scanner imaging camera 32 to execute imaging at a predetermined timing. Examples of the image processing circuit include a graphics processing unit (GPU), a field programmable gate array (FPGA), a digital signal processor (DSP), and the like. The camera image processing unit 35 receives an input of the marker image captured by the scanner imaging camera 32 and an input of images of the light emitting bodies 31*b* captured by the reference camera 34.

The camera image processing unit 35 processes the marker image captured by the scanner imaging camera 32 to generate center position information of a self-luminous marker, for example, a center position (corresponding to second measurement information of the invention) of a circular self-luminous marker. Specifically, the camera image processing unit 35 performs processing of extracting the center of the self-luminous marker with respect to the marker image. Then, the center position information of the self-luminous marker is generated based on an extracted result. Furthermore, the camera image processing unit 35 generates position and posture information of the self-luminous marker with respect to a movable imaging part 3A based on the center position information of the self-luminous marker obtained as a result of the processing of extracting the center of the self-luminous marker.

Figure 5:
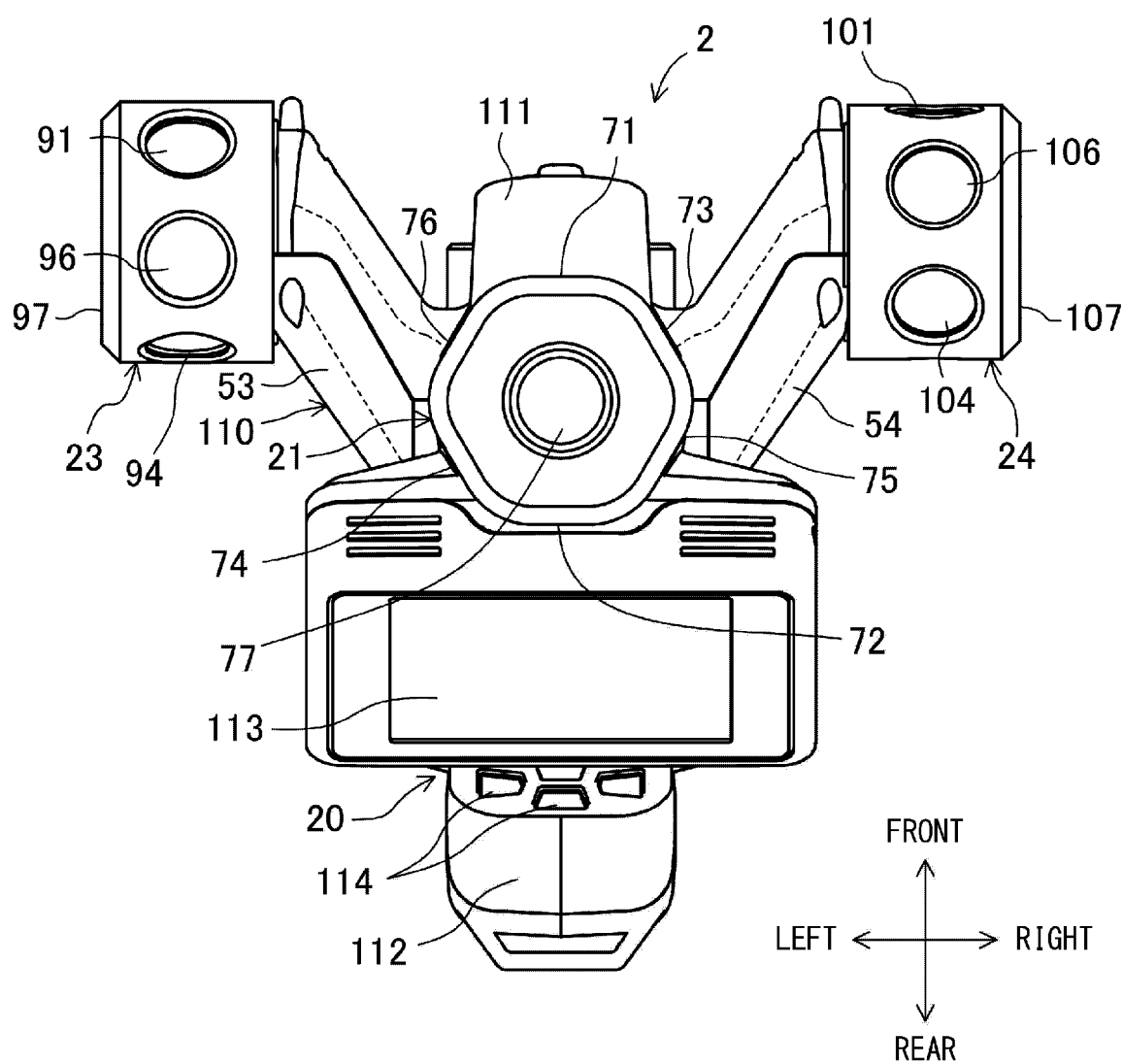
FIG. 5 is a plan view of the three-dimensional scanner.
Figure 6:
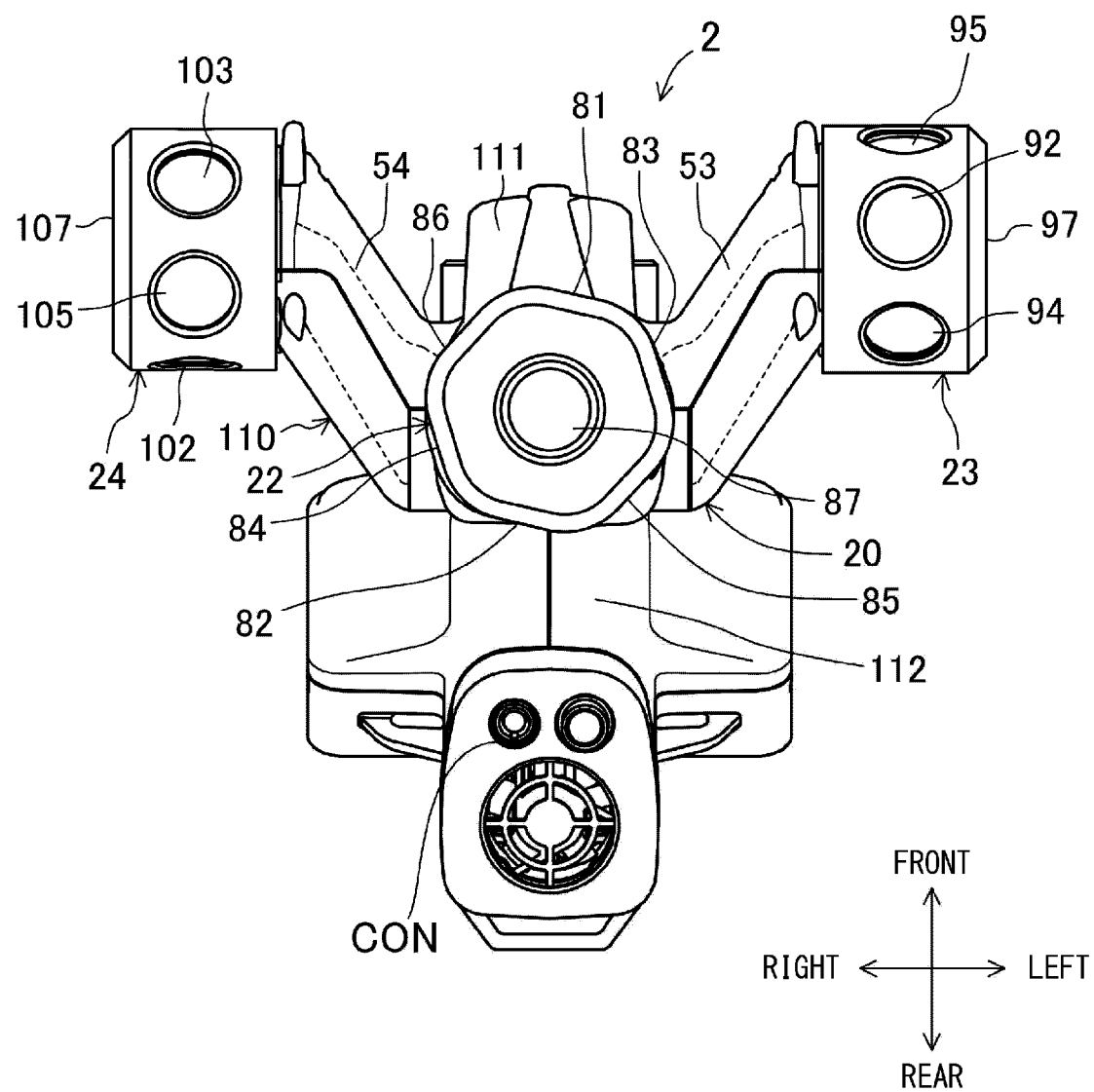
FIG. 6 is a bottom view of the three-dimensional scanner.

Referring to FIGS. 5 and 6, pieces of center position information of self-luminous markers 71 to 77, 81 to 87, 91 to 97, and 101 to 107 are generated by the following method. First, the camera image processing unit 35 acquires arrangement information of each of the self-luminous markers 71 to 77, 81 to 87, 91 to 97, and 101 to 107 stored in the three-dimensional scanner 2. Then, the camera image processing unit 35 calculates any position at which an image of each of the markers is captured by the imaging unit 3 when a relative position or posture of the three-dimensional scanner 2 with respect to the imaging unit 3 is changed based on the arrangement information of the self-luminous markers 71 to 77, 81 to 87, 91 to 97, and 101 to 107 acquired from the three-dimensional scanner 2 and relative three-dimensional position information between the markers included in the marker image generated by the camera image processing unit 35, and matches the calculated position of each of the markers with a marker position of an image 102. Then, a relative position and posture of the three-dimensional scanner 2 with respect to the imaging unit 3 in which an error between the calculated position of each of the markers and the marker position of the image 102 is minimized are calculated and generated as the center position information of each of the self-luminous markers 71 to 77, 81 to 87, 91 to 97, and 101 to 107. That is, the camera image processing unit 35 virtually changes the arrangement information of each of the self-luminous markers 71 to 77, 81 to 87, 91 to 97, and 101 to 107 acquired from the three-dimensional scanner 2 by virtually changing the position and posture of the three-dimensional scanner 2, calculates a position and a posture matching the marker image generated by the camera image processing unit 35, and generates the center position information of each of the self-luminous markers 71 to 77, 81 to 87, 91 to 97, and 101 to 107. This position and posture information calculation processing may be called bundle adjustment. Here, for the matching, some of the self-luminous markers 71 to 77, 81 to 87, 91 to 97, and 101 to 107 included in the marker image may be selectively used representative markers. The circular self-luminous markers 71 to 77, 81 to 87, 91 to 97, and 101 to 107 have an elliptical shape depending on the position and posture of the three-dimensional scanner 2. In this regard, as an example, an oblateness that is a ratio of lengths of a long side and a short side of each of the self-luminous markers 71 to 77, 81 to 87, 91 to 97, and 101 to 107 included in the marker image may be used to set the self-luminous markers 71 to 77, 81 to 87, 91 to 97, and 101 to 107 having the oblateness equal to or more than the predetermined value as representative markers while excluding a case where the oblateness is equal to or less than a predetermined value from calculation targets. Further, one close to a perfect circle in a marker block may be selected as a representative marker. As the self-luminous marker set as the calculation target is limited to the representative marker in this manner, it is possible to improve calculation speed and to suppress a decrease in measurement accuracy.

The center position information of each of the self-luminous markers 71 to 77, 81 to 87, 91 to 97, and 101 to 107 calculated here uses the scanner imaging camera 32 as a reference. In this regard, the camera image processing unit 35 calculates position and posture information of the three-dimensional scanner 2 using the reference camera 34 as a reference based on position and posture information of the scanner imaging camera 32 using the reference camera 34 as a reference and the position and posture information of the three-dimensional scanner 2 using the scanner imaging camera 32 as a reference, thereby generating the center position information of the self-luminous marker using the reference camera 34 as a reference.

The imaging unit 3 includes a wireless communication unit 36 that is controlled by the body control part 33. The wireless communication unit 36 is a communication module or the like configured to be capable of communicating with equipment other than the imaging unit 3. In this example, the imaging unit 3 communicates with the three-dimensional scanner 2 via the wireless communication unit 36, thereby enabling, for example, transmission and reception of various types of data such as image data captured by the scanner imaging camera 32, various signals, and the like.

The imaging unit 3 also includes a communication unit 37 that is controlled by the body control part 33. The communication unit 37 is a communication module or the like configured to be capable of communicating with the processing unit 4. The imaging unit 3 communicates with the processing unit 4 via the communication unit 37, thereby enabling, for example, transmission and reception of various types of data such as image data and various signals. The communication by the communication unit 37 may be wired communication or wireless communication.

The imaging unit 3 includes a trigger generation unit 38 and a trigger management unit 38*a* (which will be described in detail later) that generate identification information for identifying a synchronous execution timing based on a measurement instruction. The trigger generation unit 38 and the trigger management unit 38*a* are examples of parts constituting a synchronization mechanism. The trigger generation unit 38 may have a function of the trigger management unit 38*a*, and in this case, the synchronization mechanism is configured by the trigger generation unit 38.

For example, when the measurement worker performs a predetermined measurement start operation, the body control part 33 of the imaging unit 3 receives the measurement start operation. When receiving the measurement start operation, the body control part 33 causes the trigger generation unit 38 to generate a trigger signal as the above-described identification information. The trigger signal is transmitted to the three-dimensional scanner 2 via, for example, the wireless communication unit 36.

In response to the generation of the trigger signal, the body control part 33 synchronously executes light emission of the self-luminous markers of the three-dimensional scanner 2, imaging of the self-luminous markers of the three-dimensional scanner 2 by the movable imaging part 3A, lighting of the light emitting bodies 31b of the movable stage 31, and imaging of the light emitting bodies 31b by the reference camera 34. Note that the light emitting bodies 31b of the movable stage 31 may be constantly turned on. Therefore, the body control part 33 executes at least the light emission of the self-luminous markers of the three-dimensional scanner 2, the imaging by the movable imaging part 3A, and the imaging by the reference camera 34 in synchronization. A timing of the light emission of the self-luminous markers of the three-dimensional scanner 2 may be slightly earlier than a timing of the imaging by the movable imaging part 3A. In this case as well, it is assumed that the light emission of the self-luminous markers of the three-dimensional scanner 2 is synchronized with the imaging by the movable imaging part 3A.

The communication unit 37 transmits center position information of a self-luminous marker generated by the camera image processing unit 35 to identification information corresponding to the center position information of the self-luminous marker generated by the trigger generation unit 38 to be tied to each other. The term "tying" means linking or associating two or more pieces of information. In this case, the center position information of the self-luminous marker is linked to the identification information for distinguishing the center position information of the self-luminous marker from center position information of another self-luminous marker. Thus, center position information of a desired self-luminous marker can be specified based on the identification information. The communication unit 37 corresponds to a second transmission unit of the invention. Note that the center position information and the identification information of the self-luminous marker may be transmitted by wireless communication.

(Configuration of Wireless Communication Unit 36)

The wireless communication unit 36 performs wireless communication between the imaging unit 3 and the three-dimensional scanner 2. This wireless communication may be implemented by communication mechanisms of two systems. A first communication mechanism is optical communication using visible light or invisible light (for example, infrared rays) as electromagnetic waves. A second communication mechanism is short-range digital wireless communication using radio waves such as Bluetooth® communication or wireless LAN communication. The optical communication has characteristics that the directivity is high and the time required for information transfer is accurate. For this reason, the trigger signal generated by the trigger generation unit 38 may be transmitted from the imaging unit 3 to the three-dimensional scanner 2 by the optical communication.

(Configurations of Processing Unit 4 and Camera Image Processing Unit 35)

The processing unit 4 is a part that receives positions and postures of a plurality of markers obtained by processing a marker image generated by the imaging unit 3 from the imaging unit 3, receives edge data of a bright line image obtained by processing the bright line image generated by the three-dimensional scanner 2, and measures a three-dimensional shape of the measurement target W based on the received positions and postures of the markers and the edge data.

As a technique for measuring the three-dimensional shape, a conventionally known technique can be used. Hereinafter, an example will be described. Since the plurality of light emitting bodies 31b of the imaging unit 3 are provided on the movable stage 31 to which the scanner imaging camera 32 is fixed, a positional relationship of the plurality of light emitting bodies 31b with respect to the scanner imaging camera 32 is known. When the scanner imaging camera 32 is moved by the stage drive unit 31a, the scanner imaging camera 32 moves within a range in which images of the light emitting bodies 31b can be captured by the reference camera 34. A position and a posture of the three-dimensional scanner 2 with respect to the scanner imaging camera 32 are determined based on the marker image of the three-dimensional scanner 2 captured by the scanner imaging camera 32.

Further, the reference camera 34 similarly determines a position and a posture of the scanner imaging camera 32 with respect to the reference camera 34 based on the images obtained by capturing the plurality of light emitting bodies 31b. Specifically, the camera image processing unit 35 acquires the arrangement information of each of the light emitting bodies 31b stored in the storage unit 39c of the imaging unit 3. Then, the camera image processing unit 35 processes the images of the light emitting bodies 31b generated by the reference camera 34 based on pieces of the arrangement information of the light emitting bodies 31b, and generates position and posture information (corresponding to third measurement information of the invention) of the scanner imaging camera 32 with respect to the reference camera 34. That is, the camera image processing unit 35 estimates images when the position and posture of the scanner imaging camera 32 is virtually changed based on pieces of the arrangement information of the light emitting bodies 31b stored in the storage unit 39c of the imaging unit 3, and calculates a position and a posture matching the images of the light emitting bodies 31b actually generated by the reference camera 34, thereby generating the position and posture information of the scanner imaging camera 32 based on the reference camera 34.

A position and a posture of the three-dimensional scanner 2 with respect to the reference camera 34 are determined from the position and posture of the three-dimensional scanner 2 with respect to the scanner imaging camera 32 and the position and posture of the scanner imaging camera 32 with respect to the reference camera 34, and coordinates of a measurement point are obtained, so that three-dimensional coordinate measurement, that is, three-dimensional shape measurement becomes possible.

FIG. 1 illustrates an example in which the processing unit 4 is configured by a general-purpose notebook personal computer. However, the processing unit 4 may be configured by a desktop personal computer, a controller dedicated to the three-dimensional measurement device 1, or the like. In any case, the processing unit 4 can be used by installing a program or an application for implementing functions of the three-dimensional measurement device 1. The processing unit 4 may be provided separately from the imaging unit 3 or may be integrated with the imaging unit 3. Further, a part of the processing unit 4 may be incorporated in the imaging unit 3, or a part of the imaging unit 3 may be incorporated in the processing unit 4.

As illustrated in FIG. 2, the processing unit 4 includes a control unit 40, a monitor 41, and an operation input unit 42. The monitor 41 is configured by a liquid crystal display, an organic EL display, or the like configured to be capable of displaying various images, a user interface, and the like.

The operation input unit 42 is a part by which a user performs various input operations. The operation input unit 42 includes, for example, a keyboard, a mouse, and the like.

The control unit 40 includes a control part 43, a display control part 44, a storage unit 45, and a communication unit 46. The display control part 44 is a part that controls the monitor 41 based on a signal output from the control part 43, and causes the monitor 41 to display various images, a user interface, and the like. The user's operation performed on the user interface is acquired by the control part 43 based on a signal output from the operation input unit 42.

The storage unit 45 may be a ROM, a solid state drive, a hard disk drive, or the like. The storage unit 45 stores arrangement information of each of self-luminous markers in marker blocks provided in the three-dimensional scanner 2. The arrangement information of the marker block and each of the self-luminous markers includes a distance between the marker blocks, information indicating a relative positional relationship of the self-luminous markers provided in each of the marker blocks, and the like.

Further, the communication unit 46 of the processing unit 4 is controlled by the control part 43. The communication unit 46 is a communication module or the like configured to be capable of communicating with the communication unit 37 of the imaging unit 3.

(Configuration of Three-Dimensional Scanner 2)

The three-dimensional scanner 2 is configured such that the measurement worker can measure the shape of the measurement target W while holding and freely moving the probe with one hand or both hands, and is a handheld and portable non-contact probe. Power may be supplied from the outside, or supplied from a built-in battery. In the present embodiment, the front, rear, left, right, up, down of the three-dimensional scanner 2 are defined as illustrated in FIGS. 3 to 7. That is, when the measurement worker holds the three-dimensional scanner 2 by hand, a side located on the right is referred to as the right, and a side located on the left is referred to as the left. The front of the three-dimensional scanner 2 is a side opposing the measurement target W, and the rear side of the three-dimensional scanner 2 is a side opposite to the side opposing the measurement target W. The up of the three-dimensional scanner 2 is a side on the upper side in a state where a grip part 112, which will be described later, is gripped in a natural posture as determined, and the down of the three-dimensional scanner 2 is a side on the lower side in a state where the grip part 112 is gripped in the natural posture as determined. However, since the three-dimensional shape of the measurement target W can be measured while the three-dimensional scanner 2 is held and moved by hand as described above, the three-dimensional scanner 2 may have an orientation of being inverted upside down or a posture in which the upper side is located on the right or left, or the rear side thereof may be located at the up or down.

The three-dimensional scanner 2 includes a scanner body 20, a first marker block 21, a second marker block 22, a third marker block 23, and a fourth marker block 24. Although details will be described later, the first to fourth marker blocks 21 to 24 each have self-luminous markers facing a plurality of directions, respectively.

Figure 7:
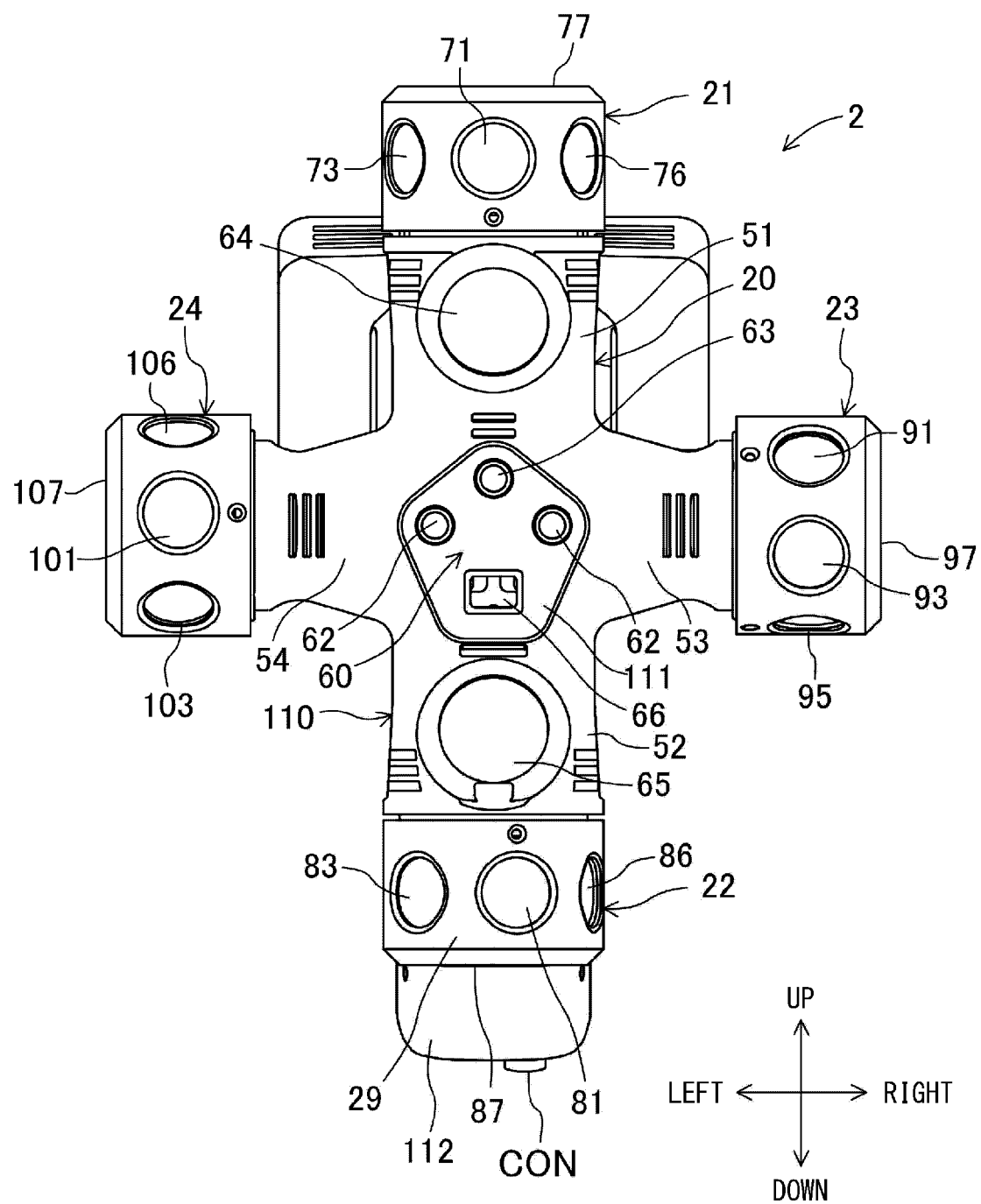
FIG. 7 is a front view of the three-dimensional scanner.

As illustrated in FIG. 7, the scanner body 20 includes a first arm part 51 extending upward from a central portion, a second arm part 52 extending downward from the central portion, a third arm part 53 extending leftward from the central portion, and a fourth arm part 54 extending rightward from the central portion. The first marker block 21 is attached to a distal end of the first arm part 51, the second marker block 22 is attached to a distal end of the second arm part 52, the third marker block 23 is attached to a distal end of the third arm part 53, and the fourth marker block 24 is attached to a distal end of the fourth arm part 54.

The first marker block 21 and the second marker block 22 are spaced apart from each other in the up-down direction, and the scanner unit 60 is arranged at the central portion between the first marker block 21 and the second marker block 22. Therefore, the first marker block 21 and the second marker block 22 constitute a pair of marker blocks arrayed side by side in the up-down direction in a state where the scanner unit 60 is positioned at the center.

Further, the third marker block 23 and the fourth marker block 24 are spaced apart from each other in the left-right direction, and the scanner unit 60 is arranged at the central portion between the third marker block 23 and the fourth marker block 24. Therefore, the third marker block 23 and the fourth marker block 24 constitute a pair of marker blocks arrayed side by side in the left-right direction in a state where the scanner unit 60 is positioned at the center.

The scanner body 20 includes the scanner unit 60. The scanner unit 60 includes two first scanner light sources 62, a second scanner light source 63, a first scanner imaging part 64, a second scanner imaging part 65, and a texture camera 66. The two first scanner light sources 62 are multi-line light sources each emitting a plurality of linear light beams in a measurement direction (forward), and are arranged such that light emission surfaces oppose the measurement target W at the time of measurement. The light emitted by the first scanner light source 62 can be referred to as multi-line light, and the multi-line light is included in pattern light.

The second scanner light source 63 is attached above the first scanner light source 62. The second scanner light source 63 is a single-line light source that emits one linear light beam in the measurement direction (forward), and is arranged such that a light emission surface opposes the measurement target W at the time of measurement. The light emitted by the second scanner light source 63 can be referred to as single-line light, and the single-line light is also included in the pattern light.

Each of the first scanner light sources 62 and the second scanner light source 63 includes the laser light source that emits the laser light, but a type of the light source is not particularly limited. Further, a total of three scanner light sources 62 and 63 are provided in this example, but the invention is not limited thereto, and one or more scanner light sources may be provided. Further, a type of the pattern light is not particularly limited, and the scanner light source may emit pattern light other than the multi-line light and the single-line light.

The first scanner imaging part 64 and the second scanner imaging part 65 include, for example, a light receiving element such as a CMOS sensor, an optical system for forming an image of light incident from the outside on a light receiving surface of the light receiving element, and the like. The first scanner imaging part 64 is attached to a portion spaced upward from the scanner light sources 62 and 63. The second scanner imaging part 65 is attached to a portion spaced downward from the scanner light sources 62 and 63.

The first scanner imaging part 64 and the second scanner imaging part 65 are arranged such that optical axes thereof are oriented in irradiation directions of beams of the pattern light from the scanner light sources 62 and 63, respectively, and accordingly, it is possible to capture images of beams of the pattern light emitted from the scanner light sources 62 and 63 in the measurement direction and generate bright line images (corresponding to a first image of the invention) including the pattern light.

Since the first scanner imaging part 64 is attached above the scanner light sources 62 and 63 and the second scanner imaging part 65 is attached below the scanner light sources 62 and 63, it is possible to secure a long distance between the first scanner imaging part 64 and the second scanner imaging part 65 and to enhance the accuracy of a stereo measurement method. That is, a distance between the optical axes of the first scanner imaging part 64 and the second scanner imaging part 65 is known, a corresponding point between the respective images generated by simultaneously capturing the pattern light emitted from the first scanner light source 62 or the second scanner light source 63 by the first scanner imaging part 64 and the second scanner imaging part 65 is obtained, and three-dimensional coordinates of the corresponding point can be obtained using the stereo measurement method. The stereo measurement method may be passive stereo using the first scanner imaging part 64 and the second scanner imaging part 65, or may be active stereo using one scanner imaging part. In particular, there is a case where the pattern light is not included in one of the images generated by the first scanner imaging part 64 and the second scanner imaging part 65, such as a case where the measurement target W is specularly reflected or a case where a deep hole is measured. In such a case, the three-dimensional coordinates may be calculated by an active stereo method based on a positional relationship between the scanner imaging part and the scanner light source corresponding to the image obtained by capturing the pattern light.

The texture camera 66 includes, for example, a light receiving element such as a CMOS sensor capable of acquiring a color image, an optical system for forming an image of light incident from the outside on a light receiving surface of the light receiving element, and the like. The texture camera 66 is provided between the first scanner imaging part 64 and the second scanner imaging part 65. The texture camera 66 is arranged such that an optical axis is oriented toward the measurement target W at the time of measurement, and captures an image of the measurement target W to generate a texture image.

The first marker block 21 includes the first to seventh self-luminous markers 71 to 77 facing a plurality of directions. The first to seventh self-luminous markers 71 to 77 all have the same structure and include a light emitting diode (LED). The second to fourth marker blocks 22 to 24 are configured similarly to the first marker block 21. That is, as illustrated in FIGS. 3 to 7, the second marker block 22 includes the first to seventh self-luminous markers 81 to 87, the third marker block 23 includes the first to seventh self-luminous markers 91 to 97, and the fourth marker block 24 includes the first to seventh self-luminous markers 101 to 107.

The scanner body 20 includes an exterior member 110. A front part of the exterior member 110 includes a scanner cover part 111 that covers the first scanner light source 62, the second scanner light source 63, the first scanner imaging part 64, and the second scanner imaging part 65. Further, a rear part of the exterior member 110 has the grip part 112 to be gripped by the measurement worker.

A display unit 113 for displaying a measurement result obtained by the scanner unit 60 and an operation unit 114 for operating the scanner unit 60 are provided at the upper end of the grip part 112. The display unit 113 is configured by a liquid crystal display, an organic EL display, or the like. Further, the display surface is oriented toward a measurement subject such that the three-dimensional scanner 2 can be moved while viewing a display content of the display unit 113.

A touch panel 113a on which a touch operation can be performed is also provided on the display surface side of the display unit 113. The operation unit 114 includes, for example, a plurality of operation buttons including a measurement start button, a measurement stop button, and the like, and is arranged below the display unit 113. The touch panel 113a can also be a part of the operation unit.

(Circuit of Three-Dimensional Scanner 2)

Next, a circuit of the three-dimensional scanner 2 will be described with reference to FIG. 8. The three-dimensional scanner 2 includes a display control part 140, a marker lighting control part 141, a scanner control part 142, and a storage unit 143. The display control part 140 is a part that controls the display unit 113 based on a signal output from the scanner control part 142, and causes the display unit 113 to display various images, a user interface, and the like. The user's operation performed on the display unit 113 is acquired by the scanner control part 142 based on a signal output from the touch panel 113a.

Figure 8:
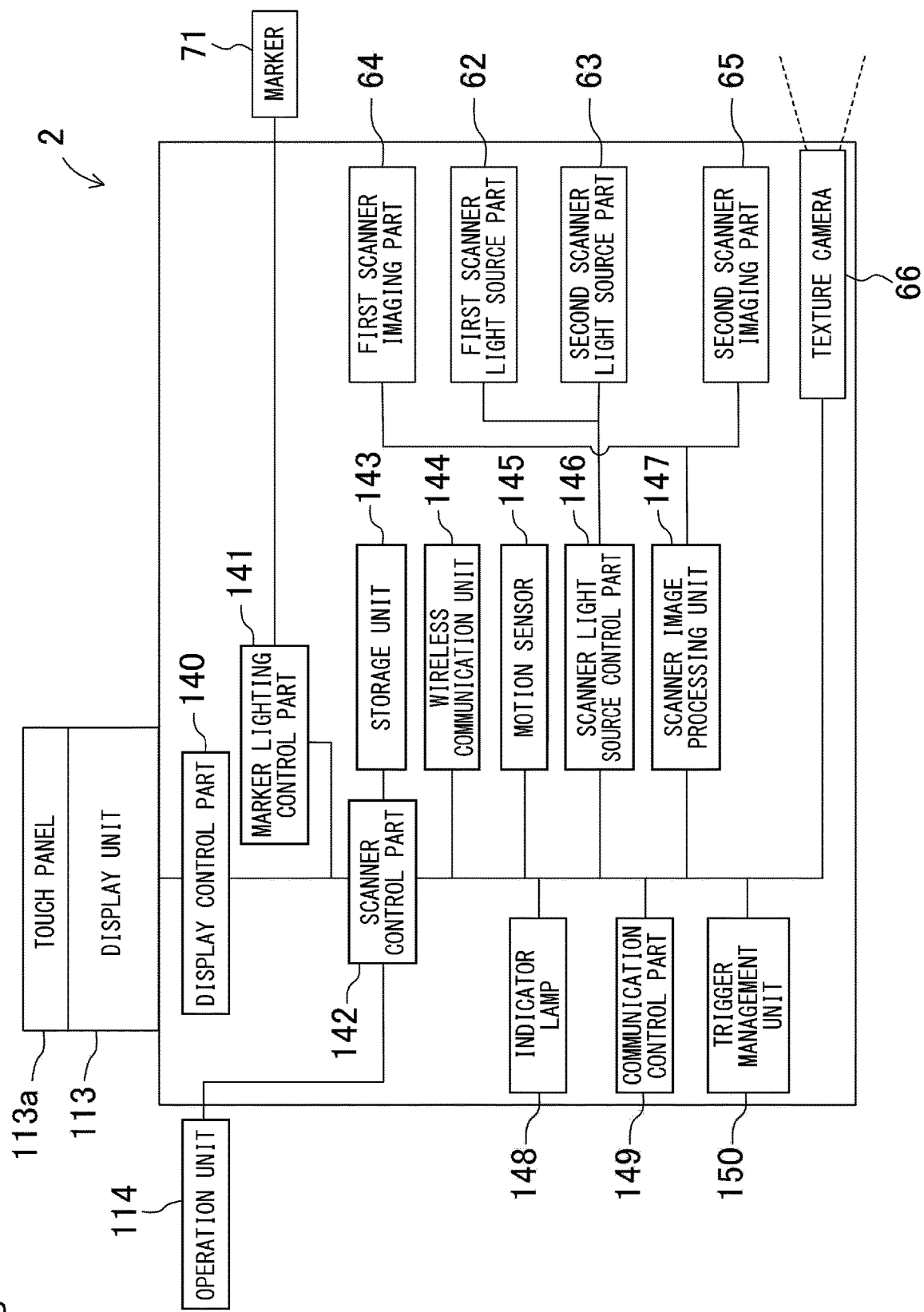
FIG. 8 is a block diagram illustrating a circuit configuration of the three-dimensional scanner.

The marker lighting control part 141 is a part that controls the self-luminous markers 71 to 77, 81 to 87, 91 to 97, and 101 to 107 (only 71 is illustrated in FIG. 8). The self-luminous markers 71 to 77, 81 to 87, 91 to 97, and 101 to 107 are switched between the turned-on state and the turned-off state by the marker lighting control part 141. The marker lighting control part 141 is controlled by the scanner control part 142. The storage unit 143 can temporarily store a program, an image captured by the scanner unit 60, and the like. Furthermore, the storage unit 143 may store arrangement information of each of the self-luminous markers 71 to 77, 81 to 87, 91 to 97, and 101 to 107 and calibration data of the three-dimensional scanner 2. Note that the arrangement information of each of the self-luminous markers 71 to 77, 81 to 87, 91 to 97, and 101 to 107 may be a unique value written in the storage unit 143 at the time of manufacturing the three-dimensional scanner 2. The calibration data may be a variable value calculated based on a calibration image obtained by causing the scanner unit 60 of the three-dimensional scanner 2 to capture an image of a calibration plate at an arbitrary timing by the user.

The three-dimensional scanner 2 includes a wireless communication unit 144 that is controlled by the scanner control part 142. The wireless communication unit 144 is a communication module or the like configured to be capable of communicating with equipment other than the three-dimensional scanner 2. In this example, the three-dimensional scanner 2 communicates with the imaging unit 3 via the wireless communication unit 144, thereby enabling, for example, transmission and reception of various types of data such as image data captured by the scanner unit 60, various signals, and the like.

The three-dimensional scanner 2 includes a motion sensor 145. The motion sensor 145 includes a sensor that detects an acceleration and an angular velocity of the three-dimensional scanner 2, and detected values are output to the scanner control part 142 and used for various types of operational processing. For example, a value output from the motion sensor 145 can be used to obtain an initial solution of the posture of the three-dimensional scanner 2, that is, the postures of the first to fourth marker blocks 21 to 24, thereby improving the matching accuracy and improving the processing speed at the time of posture calculation. The processing using the values output from the motion sensor 145 may be executed by the imaging unit 3 or the processing unit 4.

The three-dimensional scanner 2 includes a scanner light source control part 146 and a scanner image processing unit 147. The scanner light source control part 146 controls the first scanner light source 62 and the second scanner light source 63. The first scanner light source 62 and the second scanner light source 63 are switched between the turned-on state and the turned-off state by the scanner light source control part 146. The scanner light source control part 146 is controlled by the scanner control part 142. Further, the scanner image processing unit 147 controls the first scanner imaging part 64, the second scanner imaging part 65, and the texture camera 66 to execute imaging at a predetermined timing. Images captured by the first scanner imaging part 64, the second scanner imaging part 65, and the texture camera 66 are input to the scanner image processing unit 147. The scanner image processing unit 147 executes various types of image processing such as extraction of edge data on the input images.

That is, the scanner image processing unit 147 generates edge data (corresponding to first measurement information of the invention) by performing edge extraction processing on the bright line image generated by the first scanner imaging part 64 or the second scanner imaging part 65. In a case where the first scanner light source 62 emits the multi-line light, the first scanner imaging part 64 and the second scanner imaging part 65 generate multi-line images. The scanner image processing unit 147 processes the multi-line images to generate the edge data.

The wireless communication unit 144 transmits the edge data generated by the scanner image processing unit 147 and identification information corresponding to the edge data generated by the trigger generation unit 38 to be tied to each other. That is, the edge data and the identification information for distinguishing the edge data from another edge data are linked to each other. Therefore, it is possible to specify desired edge data based on the identification information. The wireless communication unit 144 corresponds to a first transmission unit of the invention. The edge data and the identification information may be transmitted by wired communication.

Similarly to the wireless communication by the wireless communication unit 36, the wireless communication by the wireless communication unit 144 may be implemented by communication mechanisms of two systems. A first communication mechanism is optical communication using visible light or invisible light (for example, infrared rays) as electromagnetic waves. A second communication mechanism is short-range digital wireless communication using radio waves such as Bluetooth® communication or wireless LAN communication. The optical communication has characteristics that the directivity is high and the time required for information transfer is accurate. For this reason, the trigger signal generated by the trigger generation unit 38 may be received via the first communication mechanism of the wireless communication unit 144. Further, the wireless communication using radio waves has characteristics that it is possible to transmit and receive information having a large data amount although the time required for information transfer is indefinite. In this regard, the edge data generated by the scanner image processing unit 147 may be transmitted via the second communication mechanism of the wireless communication unit 144.

Further, the trigger generation unit 38 of the imaging unit 3 generates a trigger signal that defines a synchronous execution timing based on a measurement instruction. The scanner imaging camera 32, the reference camera 34, and the light emitting bodies 31b of the imaging unit 3 are synchronously controlled by the trigger signal generated by the trigger generation unit 38. Further, the trigger signal generated by the trigger generation unit 38 is transmitted to a trigger management unit 38a. The trigger management unit 38a generates identification information for identifying the trigger signal in response to reception of the trigger signal. The trigger management unit 38a includes, for example, a ring buffer or a counter, and manages the generated identification information by the ring buffer or the counter. The trigger management unit 38a refers to the ring buffer or the counter in response to the reception of the trigger signal, and generates information obtained by performing a predetermined operation on information corresponding to the next buffer area or a value held in the counter as the identification information corresponding to the received trigger signal. Since the identification information uniquely identifies the trigger signal generated by the trigger generation unit 38, the identification information can also be referred to as a trigger ID. For example, when the measurement worker performs a predetermined measurement start operation, the body control part 33 of the imaging unit 3 receives the measurement start operation. When receiving the measurement start operation, the body control part 33 causes the trigger generation unit 38 to generate the trigger signal. The trigger is transmitted to the three-dimensional scanner 2 via, for example, the wireless communication unit 36 or a communication cable connected to a connector CON. Note that various types of data such as image data captured by the three-dimensional scanner 2, various signals, and the like may be transmitted and received via the communication cable. Since the three-dimensional scanner 2 and the imaging unit 3 are wirelessly connected to each other, there is no restriction of the cable or the like, so that the portability of the three-dimensional scanner 2 can be enhanced, and a measurement region can be expanded. Further, since the three-dimensional scanner 2 and the imaging unit 3 are wirelessly connected, it is possible to perform high-speed and large-capacity communication, it is not necessary to accommodate a power source such as a battery, and it is possible to reduce the weight.

When the trigger signal generated by the trigger generation unit 38 of the imaging unit 3 is transmitted to the three-dimensional scanner 2, the scanner control part 142 receives the trigger signal via the wireless communication unit 144 of the three-dimensional scanner 2. As described above, the trigger signal generated by the trigger generation unit 38 may be received by the first communication mechanism using the optical communication of the wireless communication unit 144. When the scanner control part 142 receives the trigger signal, the scanner light source control part 146 executes irradiation of pattern light from the first scanner light source 62 or the second scanner light source 63, the scanner image processing unit 147 executes imaging by the first scanner imaging part 64 and the second scanner imaging part 65, and the marker lighting control part 141 causes the self-luminous markers 71 to 77, 81 to 87, 91 to 97, and 101 to 107 to emit light. The irradiation of pattern light from the first scanner light source 62 or the second scanner light source 63, the imaging by the first scanner imaging part 64 and the second scanner imaging part 65, and the light emission of the self-luminous markers 71 to 77, 81 to 87, 91 to 97, and 101 to 107 are synchronized with each other.

In short, the body control part 33 of the imaging unit 3 and the scanner control part 142 of the three-dimensional scanner 2 cooperate to synchronize the irradiation of pattern light from the scanner light source 62 or 63, the imaging by the scanner imaging parts 64 and 65, the light emission of the self-luminous markers 71 to 77, 81 to 87, 91 to 97, and 101 to 107, and the imaging by the movable imaging part 3A in response to the generation of the trigger signal by the trigger generation unit 38. Therefore, the body control part 33 and the scanner control part 142 constitute a measurement control part of the invention. Note that the irradiation of pattern light from the scanner light source 62 or 63, the imaging by the scanner imaging parts 64 and 65, the light emission of the self-luminous markers 71 to 77, 81 to 87, 91 to 97, and 101 to 107, and the imaging by the movable imaging part 3A may be synchronized by one measurement control part.

The three-dimensional scanner 2 includes an indicator lamp 148 and the communication control part 149. The indicator lamp 148 displays an operation state of the three-dimensional scanner 2, and is controlled by the scanner control part 142. The communication control part 149 is a part that performs processing of executing communication of, for example, image data and the like.

(Three-Dimensional Data Generation Unit)

Figure 9:
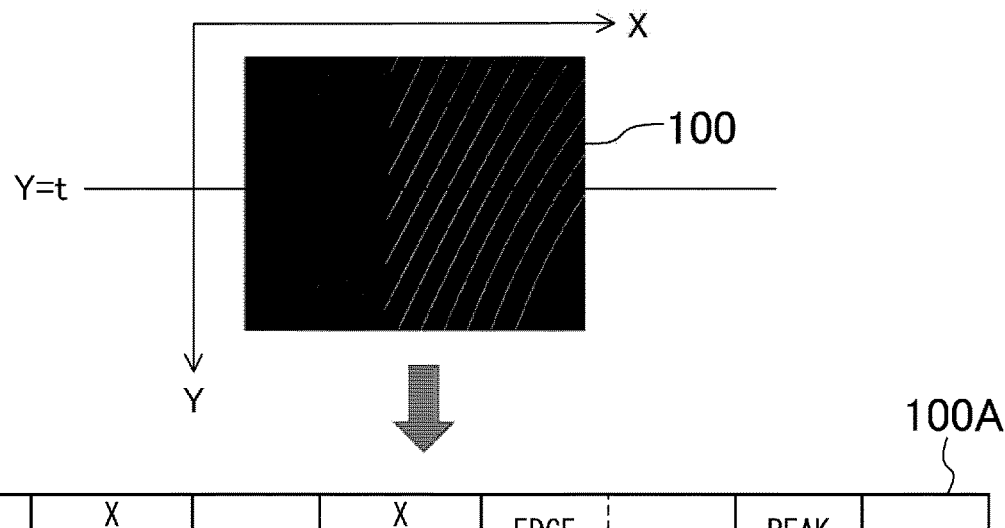
FIG. 9 is a view illustrating examples of a multi-line image and edge data.
Figure 10:
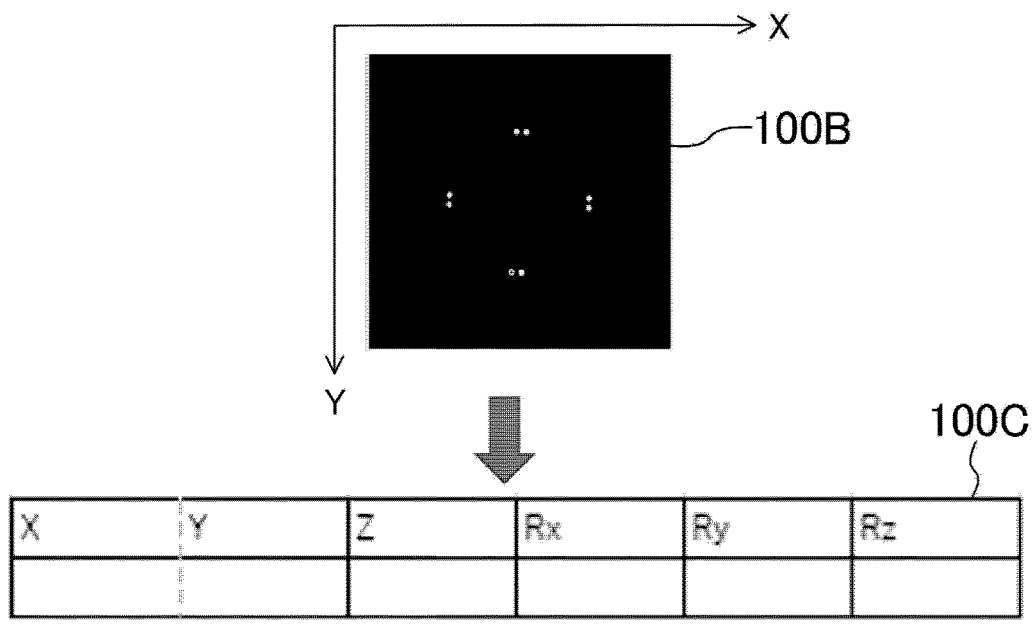
FIG. 10 is a view illustrating examples of center position information of a marker image and a self-luminous marker.

The processing unit 4 includes a three-dimensional data generation unit (three-dimensional data generation mechanism) 43a that generates a point cloud indicating the three-dimensional shape of the measurement target W based on the edge data generated by the scanner image processing unit 147, the center position information of each of the self-luminous markers generated by the camera image processing unit 35, and the position and posture information of the scanner imaging camera 32. An image 100 on the upper side in FIG. 9 illustrates an example of the multi-line images generated by the first scanner imaging part 64 and the second scanner imaging part 65. A table 100A on the lower side in FIG. 9 illustrates an example of the edge data generated by processing the multi-line images by the scanner image processing unit 147. Further, an image 100B on the upper side in FIG. 10 illustrates an example of the marker image generated by the scanner imaging camera 32. A table 100C on the lower side in FIG. 10 illustrates an example of the center position information generated by processing the marker image by the camera image processing unit 35.

As illustrated in the tables 100A and 100C, it is possible to compress image data and transmit necessary information by transmitting the edge data instead of the images captured by the scanner imaging parts 64 and 65 and transmitting the center position information of each of the self-luminous markers instead of the image captured by the scanner imaging camera 32. Further, subpixel processing is performed in the edge data extraction processing so that not only the image data can be compressed, but also more accurate data can be transmitted. Note that, in a case where three-dimensional coordinates are calculated by a passive stereo method, each of first edge data calculated from the pattern image generated by the first scanner imaging part 64 and second edge data calculated from the pattern image generated by the second scanner imaging part 65 can be transmitted with the same assigned identification information.

Here, the edge data is calculated for each of the multi-line images generated by the first scanner imaging part 64 and the second scanner imaging part 65. The edge data is calculated by specifying a change in a luminance value for each Y coordinate of the multi-line image and performing arithmetic processing such as differential processing on the change in the luminance value. That is, the edge data is data indicating a position (X coordinate) of a bright line in each Y coordinate. In the example illustrated in FIG. 9, for each Y coordinate, X coordinates (peak positions) of fifteen points from X coordinate 1 to X coordinate 15 as peaks of the luminance value are calculated. Further, an edge width is a peak width of the luminance value, and the peak value is a peak height at each X coordinate. The edge width and the peak value can also be referred to as reliability information, and are used for three-dimensional coordinate calculation to be described later. In this manner, the edge data including the peak position in each Y coordinate and the reliability information is generated from the multi-line image, and pieces of the edge data generated from the multi-line images, respectively, are transmitted to the three-dimensional data generation unit 43a.

Further, the center position information of each of the self-luminous markers 71 to 77, 81 to 87, 91 to 97, and 101 to 107 is generated by the following method. First, the camera image processing unit 35 acquires the arrangement information of each of the self-luminous markers 71 to 77, 81 to 87, 91 to 97, and 101 to 107 from the storage unit 143 of the three-dimensional scanner 2. Then, the camera image processing unit 35 calculates any position at which an image of each of the markers is captured by the imaging unit 3 when a relative position or posture of the three-dimensional scanner 2 with respect to the imaging unit 3 is changed based on the arrangement information of the self-luminous markers 71 to 77, 81 to 87, 91 to 97, and 101 to 107 acquired from the storage unit 143 of the three-dimensional scanner 2 and relative three-dimensional position information between the markers included in the marker image generated by the camera image processing unit 35, and matches the calculated position of each of the markers with a marker position of an image 102. Then, a relative position and posture of the three-dimensional scanner 2 with respect to the imaging unit 3 in which an error between the calculated position of each of the markers and the marker position of the image 102 is minimized are calculated and generated as the center position information of each of the self-luminous markers 71 to 77, 81 to 87, 91 to 97, and 101 to 107 illustrated in Table 100C. That is, the camera image processing unit 35 virtually changes the arrangement information of each of the self-luminous markers 71 to 77, 81 to 87, 91 to 97, and 101 to 107 acquired from the storage unit 143 of the three-dimensional scanner 2 by virtually changing the position and posture of the three-dimensional scanner 2, calculates a position and a posture matching the marker image generated by the camera image processing unit 35, and generates the center position information of each of the self-luminous markers 71 to 77, 81 to 87, 91 to 97, and 101 to 107. This position and posture information calculation processing may be called bundle adjustment. Here, for the matching, some of the self-luminous markers 71 to 77, 81 to 87, 91 to 97, and 101 to 107 included in the marker image may be selectively used representative markers. The circular self-luminous markers 71 to 77, 81 to 87, 91 to 97, and 101 to 107 have an elliptical shape depending on the position and posture of the three-dimensional scanner 2. In this regard, as an example, an oblateness that is a ratio of lengths of a long side and a short side of each of the self-luminous markers 71 to 77, 81 to 87, 91 to 97, and 101 to 107 included in the marker image may be used to set the self-luminous markers 71 to 77, 81 to 87, 91 to 97, and 101 to 107 having the oblateness equal to or more than the predetermined value as representative markers while excluding a case where the oblateness is equal to or less than a predetermined value from calculation targets. Further, one close to a perfect circle in a marker block may be selected as a representative marker. As the self-luminous marker set as the calculation target is limited to the representative marker in this manner, it is possible to improve calculation speed and to suppress a decrease in measurement accuracy.

The center position information of each of the self-luminous markers 71 to 77, 81 to 87, 91 to 97, and 101 to 107 calculated here uses the scanner imaging camera 32 as a reference. In this regard, the camera image processing unit 35 calculates position and posture information of the three-dimensional scanner 2 using the reference camera 34 as a reference based on position and posture information of the scanner imaging camera 32 using the reference camera 34 as a reference and the position and posture information of the three-dimensional scanner 2 using the scanner imaging camera 32 as a reference, thereby generating the center position information of the self-luminous marker using the reference camera 34 as a reference.

Note that a value output from the motion sensor 145 at the time of generating the center position information of the self-luminous markers 71 to 77, 81 to 87, 91 to 97, and 101 to 107 can be used to obtain an initial solution of the posture of the three-dimensional scanner 2, that is, the postures of the first to fourth marker blocks 21 to 24, thereby improving the matching accuracy and improving the processing speed at the time of posture calculation.

When imaging is executed, the three-dimensional data generation unit 43a receives edge data generated by the scanner image processing unit 147, identification information corresponding to the edge data, center position information of each of the self-luminous markers generated by the camera image processing unit 35, and identification information corresponding to the center position information of each of the self-luminous markers. Further, the three-dimensional data generation unit 43a may acquire calibration data from the storage unit 143 of the three-dimensional scanner 2 in advance, and store the acquired calibration data in the storage unit 45 of the processing unit 4. Then, the three-dimensional data generation unit 43a generates a point cloud indicating a three-dimensional shape of the measurement target W based on the edge data, the identification information corresponding to the edge data, the center position information of each of the self-luminous markers, the identification information corresponding to the center position information of each of the self-luminous markers, and the calibration data of the three-dimensional scanner 2 stored in the storage unit 45 of the processing unit 4. Arrangements of the markers of the three-dimensional scanner 2 vary for each individual. In this manner, when the point cloud indicating the three-dimensional shape of the measurement target W is generated, the influence of the variation is suppressed for each individual by using the calibration data acquired from the storage unit 143 of the three-dimensional scanner 2, and the point cloud corresponding to the individual used for the three-dimensional measurement can be generated.

The three-dimensional data generation unit 43a may use the reliability information included in the edge data when generating the point cloud indicating the three-dimensional shape of the measurement target W. That is, it may be determined whether each set of coordinates of (X, Y) is a valid value or an invalid value based on the magnitude of the edge width or the peak value which is the reliability information, and the point cloud may be generated using a set of coordinates determined to be the valid value.

Specifically, the processing unit 4 first specifies a corresponding point between the first edge data and the second edge data generated by the camera image processing unit 35. That is, for each set of coordinates of (X, Y) included in the first edge data, corresponding coordinates are specified from sets of coordinates of (X, Y) included in the second edge data. Here, matching between each set of coordinates is performed in a three-dimensional space. Note that edge data of one may be projected onto a pattern image of the other, and the closest edge data may be specified as the corresponding point. Then, coordinates are calculated by the triangulation using a corresponding set of coordinates between the first edge data and the second edge data. This coordinate calculation is executed for each set of coordinates included in the edge data to generate a point cloud of the measurement target W with the scanner imaging parts 64 and 65 of the three-dimensional scanner 2 as references. Since the positional relationship between the scanner imaging parts 64 and 65 of the three-dimensional scanner 2 and the self-luminous markers 71 to 77, 81 to 87, 91 to 97, and 101 to 107 is known in advance, a point cloud of the measurement target W with the reference camera 34 as a reference is generated based on the center position information of the self-luminous markers 71 to 77, 81 to 87, 91 to 97, and 101 to 107 obtained with the reference camera 34 as the reference and the point cloud of the measurement target W obtained with the scanner imaging parts 64 and 65 as the references.

In this example, as illustrated in FIG. 2, the imaging unit 3 includes a memory 39a that sequentially accumulates pieces of the edge data generated by the scanner image processing unit 147, and an association unit 39b that associates pieces of the edge data with pieces of the center position information of the self-luminous markers based on identification information. For example, in a case of sequentially measuring a plurality of the measurement targets W or in a case of sequentially measuring different portions of the same measurement target W, the scanner image processing unit 147 generates a plurality of pieces of the edge data. The plurality of pieces of generated edge data are transmitted from the wireless communication unit 144 of the three-dimensional scanner 2 to the imaging unit 3 with mutually different pieces of identification information being tied thereto. The plurality of pieces of edge data transmitted from the wireless communication unit 144 of the three-dimensional scanner 2 are accumulated in the memory 39a of the imaging unit 3 with pieces of the identification information being tied thereto.

When the three-dimensional data generation unit 43a is caused to generate the point cloud indicating the three-dimensional shape, the association unit 39b specifies center position information of a self-luminous marker transmitted to the three-dimensional data generation unit 43a. The association unit 39b specifies edge data having the identification information associated with the specified center position information of the self-luminous marker from among the plurality of pieces of edge data accumulated in the memory 39a. Thereafter, the association unit 39b associates the specified edge data with the center position information of the self-luminous marker. The communication unit 37 of the imaging unit 3 transmits the edge data specified by the association unit 39b and the center position information of the self-luminous marker in association with each other to the three-dimensional data generation unit 43a. That is, a processing content is different between the generation of the center position information of the self-luminous marker and the generation of the edge data, and thus, there is a case where a timing at which the processing ends is different therebetween. However, the synchronization based on the trigger ID as in this example enables generation of the point cloud indicating the three-dimensional shape between corresponding ones regardless of a difference between the timings at which the processing ends.

(Measurement by Three-Dimensional Measurement Device 1)

Figure 11:
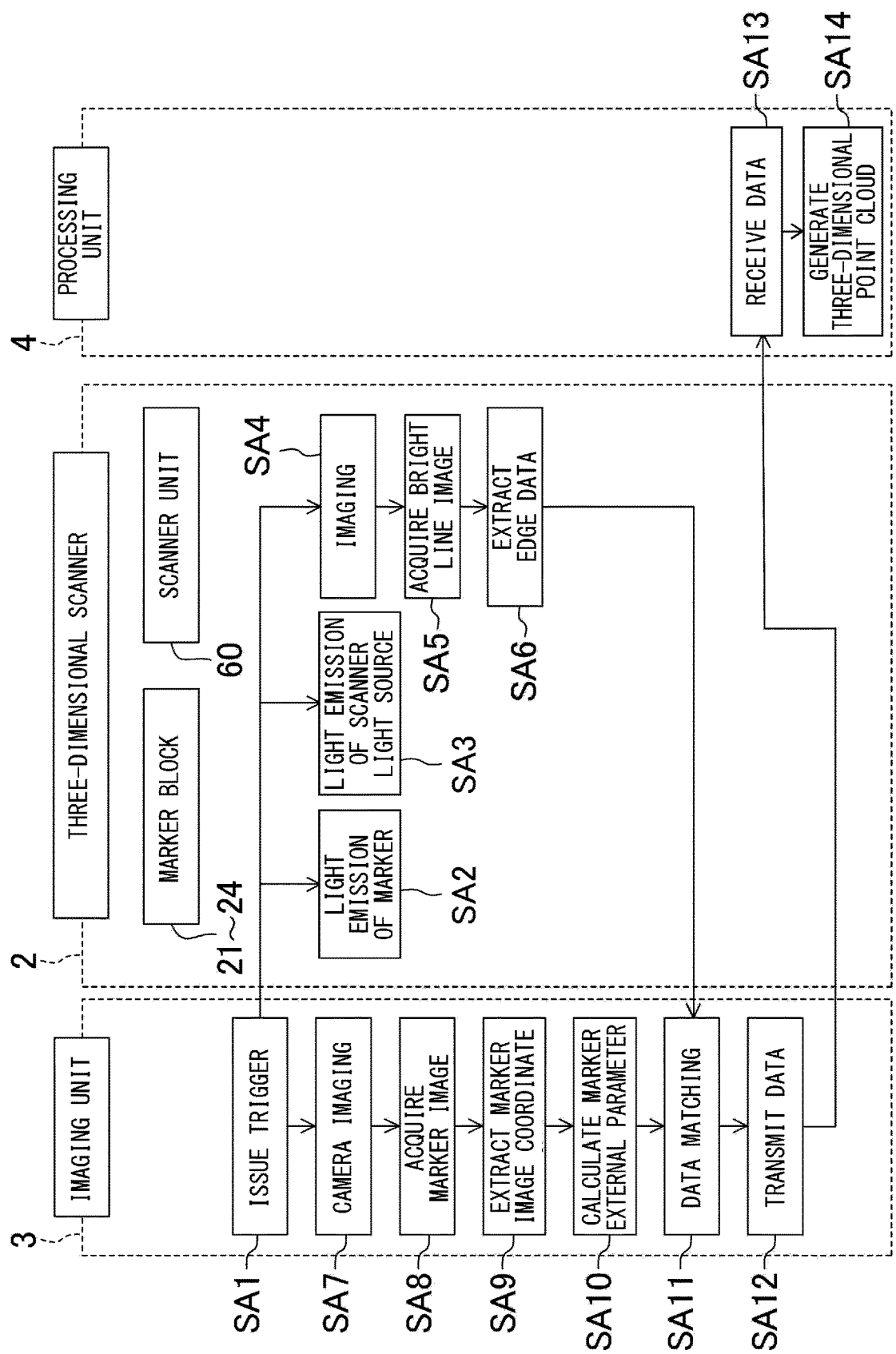
FIG. 11 is a flowchart illustrating an example of a procedure of three-dimensional shape measurement of a measurement target by the three-dimensional measurement device.

Next, a procedure of three-dimensional shape measurement of the measurement target W by the three-dimensional measurement device 1 configured as described above will be described with reference to a flowchart illustrated in FIG. 11. The measurement worker holds the grip part 112 of the three-dimensional scanner 2 and orients the scanner unit 60 toward the measurement target W, and then, operates the measurement start button included in the operation unit 114. Then, in Step SA1, the trigger generation unit 38 of the imaging unit 3 issues a trigger signal. Further, in response to the generation of the trigger signal by the trigger generation unit 38, the trigger management unit 38a generates identification information corresponding to the trigger signal. This identification information serves for the trigger signal as an ID to identify an issuance timing of the trigger signal.

The trigger signal issued by the imaging unit 3 is transmitted to the three-dimensional scanner 2 via a communication cable connected to the wireless communication unit 36 or the connector CON of the imaging unit 3. Then, the trigger signal is received by the communication control part 149 via the wireless communication unit 144 or the communication cable of the three-dimensional scanner 2. When the three-dimensional scanner 2 receives the trigger signal from the communication control part 149, the trigger management unit 150 of the three-dimensional scanner 2 generates identification information corresponding to the trigger signal. In Step SA2, the scanner control part 142 of the three-dimensional scanner 2 outputs a light emission instruction to the marker lighting control part 141, and the marker lighting control part 141 causes the self-luminous markers 71 to 77, 81 to 87, 91 to 97, and 101 to 107 to emit light. In Step SA3, the scanner control part 142 of the three-dimensional scanner 2 outputs a light emission instruction to the scanner light source control part 146, and the scanner light source control part 146 causes the first scanner light source 62 or the second scanner light source 63 to emit light. Which of the first scanner light source 62 and the second scanner light source 63 is caused to emit light is determined in advance at the time of pre-setting.

Further, in Step SA4, at the same time as Step SA3, the scanner control part 142 of the three-dimensional scanner 2 outputs an imaging instruction to the scanner image processing unit 147, and the scanner image processing unit 147 causes the first scanner imaging part 64 and the second scanner imaging part 65 to execute imaging. In Step SA5, a bright line image is acquired by the imaging by the first scanner imaging part 64 and the second scanner imaging part 65. A trigger ID (identification information) is tied to the bright line image. In Step SA6, the bright line image is input to the scanner image processing unit 147, and the scanner image processing unit 147 extracts edge data from the bright line image. A trigger ID which is identification information is assigned to the edge data, and the edge data to which the trigger ID is assigned is received by the wireless communication unit 144 of the imaging unit 3 via the wireless communication unit 36 of the three-dimensional scanner 2.

With the above configuration, lighting of the first scanner light source 62 and the second scanner light source 63, imaging by the first scanner imaging part 64 and the second scanner imaging part 65, lighting of the self-luminous markers 71 to 77, 81 to 87, 91 to 97, and 101 to 107, imaging of the self-luminous markers of the three-dimensional scanner 2 by the scanner imaging camera 32, lighting of the light emitting bodies 31b of the movable stage 31, and imaging of the light emitting bodies 31b by the reference camera 34 are executed in synchronization with each other via the trigger signal.

Meanwhile, in the imaging unit 3, after the trigger signal is issued in Step SA1, the processing proceeds to Step SA7, the body control part 33 outputs an imaging instruction to the camera image processing unit 35, and the camera image processing unit 35 causes the scanner imaging camera 32 to execute imaging. At this time, since each of the first to fourth marker blocks 21 to 24 includes the self-luminous markers 71 to 77, 81 to 87, 91 to 97, and 101 to 107 that emit light in a plurality of directions, even if an orientation and a posture of the three-dimensional scanner 2 change variously, the number of markers necessary for measurement is arranged to face the scanner imaging camera 32 of the imaging unit 3. Therefore, in Step SA8, the scanner imaging camera 32 can acquire a marker image including a plurality of self-luminous markers. Further, since imaging of the scanner imaging camera 32 and light emission of the self-luminous markers 71 to 77, 81 to 87, 91 to 97, and 101 to 107 are executed in synchronization with the trigger signal, light emission time of the self-luminous markers 71 to 77, 81 to 87, 91 to 97, and 101 to 107 can be shortened. As a result, it is possible to suppress heat generated inside the scanner body 20 by the light emission of the self-luminous markers 71 to 77, 81 to 87, 91 to 97, and 101 to 107. Note that a trigger ID is tied to the marker image.

In Step SA9, the marker image is input to the camera image processing unit 35 of the imaging unit 3, and the camera image processing unit 35 extracts a marker image coordinate. In Step SA10, a marker external parameter is calculated. The marker external parameter is a six-axis parameter. Note that a trigger ID, which is identification information, is assigned to a marker image coordinate extracted in Step SA9 and the marker external parameter calculated in Step SA10. Then, in Step SA11, data matching between the edge data transmitted from the three-dimensional scanner 2 and the marker image coordinate is executed based on the trigger ID. Details of the data matching will be described later.

In Step SA12, data obtained in Step SA11 is transmitted to the communication unit 46 of the processing unit 4 via the communication unit 37. In Step SA13, the control part 43 of the processing unit 4 processes the data transmitted from the imaging unit 3. In Step SA14, the three-dimensional data generation unit 43a generates a three-dimensional point cloud. As a result, a three-dimensional shape of the measurement target W is obtained.

(Details of Data Matching)

Figure 12:
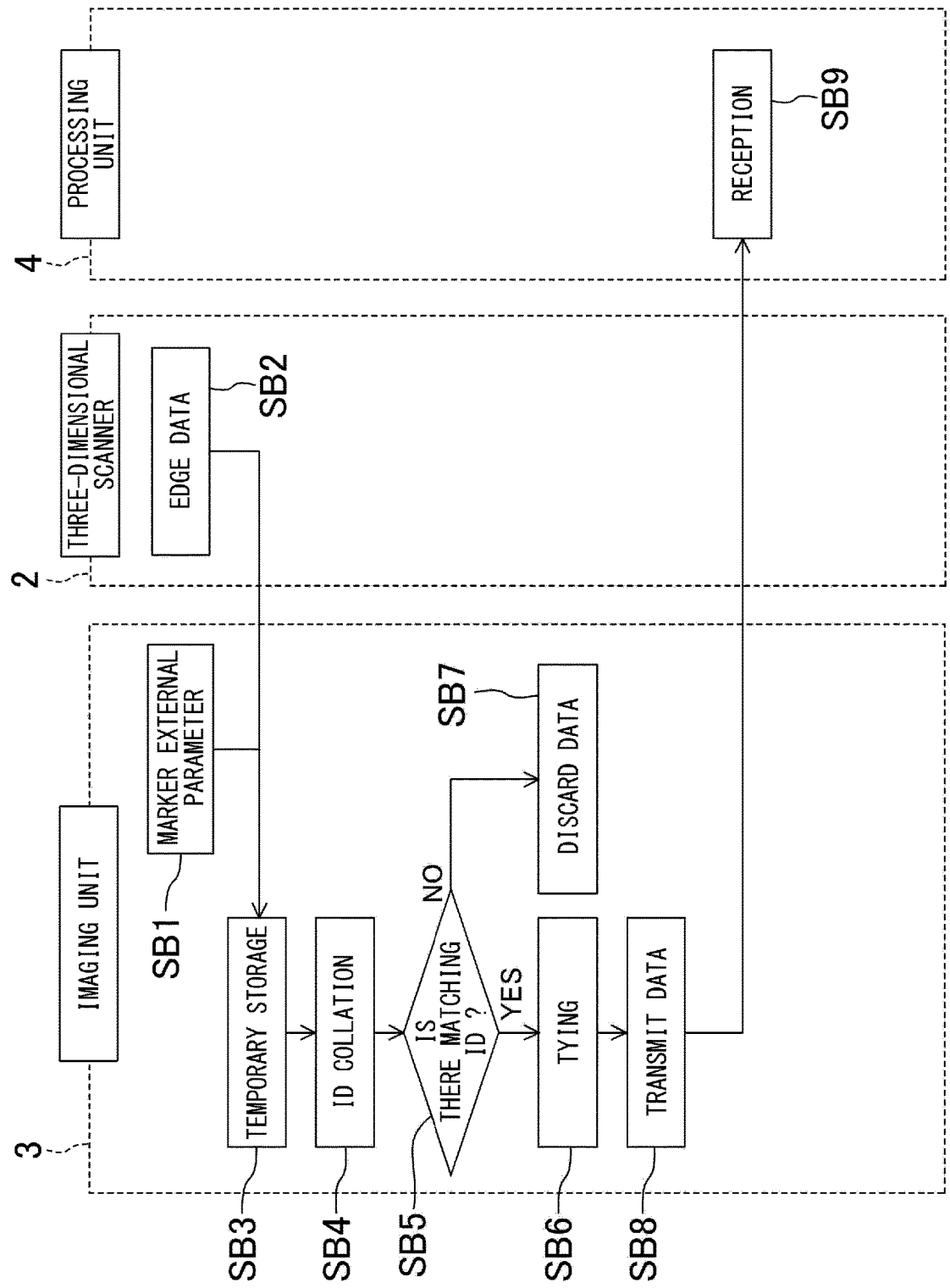
FIG. 12 is a flowchart illustrating an example of a procedure of data matching processing.

FIG. 12 is a flowchart illustrating an example of a procedure of data matching processing. In Step SB1, the imaging unit 3 acquires data of the marker external parameter calculated in Step SA10 of the flowchart illustrated in FIG. 11. Further, in Step SB2, the three-dimensional scanner 2 acquires the edge data extracted in Step SA6 of the flowchart illustrated in FIG. 11, and transmits the edge data to the imaging unit 3. In Step SB3, the imaging unit 3 temporarily stores the marker external parameter data acquired in Step SB1 and the edge data acquired in Step SB2.

In Step SB4, ID collation between the marker external parameter data and the edge data is executed based on the trigger IDs assigned in advance. In Step SB5, it is determined whether the trigger IDs match. If the trigger IDs match (YES in Step SB5), the marker external parameter data is tied to the edge data in Step SB6. If the trigger IDs do not match (NO in Step SB5), the marker external parameter data and the edge data are discarded in Step SB7. After Step SB6, data transmission processing with respect to the processing unit 4 is executed in Step SB8. In Step SB9, the processing unit 4 receives the data.

(Generation of Texture Image)

When the three-dimensional scanner 2 receives a trigger signal for texture acquisition by the communication control part 149, the scanner control part 142 can control the texture camera 66 to execute imaging. Note that the trigger signal may be distinguished between a trigger signal for three-dimensional shape measurement and the trigger signal for texture acquisition, and a part or all thereof may be shared. The trigger signal for three-dimensional shape measurement and the trigger signal for texture acquisition may be distinguished from each other, and by sharing a part or all of them, it is possible to enhance synchronization between the imaging by the scanner imaging parts 64 and 65 and the imaging by the texture camera 66. Further, the trigger signal for texture acquisition may be generated by the trigger generation unit 38 of the imaging unit 3 according to an operation signal received by the operation input unit 42 of the processing unit 4.

When the trigger signal for texture acquisition is generated, the reference camera 34 captures images of the light emitting bodies 31b. Then, the camera image processing unit 35 acquires pieces of the arrangement information of the light emitting bodies 31b stored in the storage unit 39c of the imaging unit 3, processes the images of the light emitting bodies 31b generated by the reference camera 34 based on pieces of the arrangement information of the light emitting bodies 31b, and generates the position and posture information of the scanner imaging camera 32 with respect to the reference camera 34.

The scanner imaging camera 32 generates a marker image including the self-luminous markers 71 to 77, 81 to 87, 91 to 97, and 101 to 107 of the three-dimensional scanner 2. Further, the reference camera 34 captures images of a plurality of the light emitting bodies 31b provided in the movable imaging part 3A and generates an image including the light emitting bodies 31b. Then, the camera image processing unit 35 of the imaging unit 3 calculates position and posture information of the three-dimensional scanner 2 with the scanner imaging camera 32 as a reference based on the marker image including the self-luminous markers 71 to 77, 81 to 87, 91 to 97, and 101 to 107 and pieces of the arrangement information of the self-luminous markers 71 to 77, 81 to 87, 91 to 97, and 101 to 107 acquired from the storage unit 143 of the three-dimensional scanner 2. Further, thus, the position and posture of the three-dimensional scanner 2 with the reference camera 34 as the reference are calculated.

Further, the texture camera 66 of the three-dimensional scanner 2 is controlled in synchronization with the generation of the trigger signal for texture acquisition, thereby generating a texture image. The texture image generated here is obtained with the texture camera 66 as a reference. Since the positional relationship between the texture camera 66 of the three-dimensional scanner 2 and the self-luminous markers 71 to 77, 81 to 87, 91 to 97, and 101 to 107 is known in advance, the texture image can be superimposed on a point cloud of the measurement target W with the reference camera 34 as a reference based on the position and posture (the center position information of each of the self-luminous markers 71 to 77, 81 to 87, 91 to 97, and 101 to 107) of the three-dimensional scanner 2 with the reference camera 34 obtained as the reference and the texture image of the measurement target W obtained with the texture camera 66 as the reference.

(Functions and Effects of Embodiment)

As described above, for example, when the trigger signal as the identification information is generated by the trigger generation unit 38 based on the measurement instruction by the measurement worker, the scanner light source 62 or 63 emits the pattern light, and the scanner imaging parts 64 and 65 generate the bright line images including the pattern light. Further, the self-luminous markers 71 to 77, 81 to 87, 91 to 97, and 101 to 107 of the three-dimensional scanner 2 emit light, and the scanner imaging camera 32 of the imaging unit 3 generates the marker image including the plurality of self-luminous markers 71 to 77, 81 to 87, 91 to 97, and 101 to 107. These are synchronously executed based on the trigger signal.

The edge data generated by processing the bright line images generated by the scanner imaging parts 64 and 65 is received by the three-dimensional data generation unit 43a in association with the identification information corresponding to the edge data. Further, the center position information of each of the self-luminous markers generated by processing the marker image generated by the scanner imaging camera 32 is received by the three-dimensional data generation unit 43a in association with the identification information. As a result, the three-dimensional data generation unit 43a can generate the point cloud indicating the three-dimensional shape of the measurement target W based on the edge data and the center position information of each of the self-luminous markers without erroneously combining the edge data and the center position information of each of the self-luminous markers acquired at the same timing. That is, it is sufficient to transmit the edge data obtained by processing the bright line images and the center position information of each of the self-luminous markers obtained by processing the marker image to the three-dimensional data generation unit 43a, and thus, a data amount is reduced as compared with a case where image data such as the bright line images and the marker image is directly transmitted, and transmission at a high frame rate becomes possible, whereby high-speed scanning can be implemented by the three-dimensional scanner 2.

The above-described embodiment is merely an example in all respects, and should not be construed as limiting. Furthermore, all modifications and changes belonging to the equivalent range of the claims fall within the scope of the invention.

For example, the trigger signal may be generated by the three-dimensional scanner 2 and transmitted to the imaging unit 3. Further, the trigger signal may be generated by the processing unit 4 and transmitted to the three-dimensional scanner 2 and the imaging unit 3.

As described above, the present invention can be used in the case of measuring three-dimensional shapes of various measurement targets.

What is claimed is:

1. A three-dimensional measurement device that measures a three-dimensional shape of a measurement target, the three-dimensional measurement device comprising:
a three-dimensional scanner including a scanner light source that emits pattern light, a scanner imaging part that captures the pattern light emitted by the scanner light source to generate a first image including the pattern light, a scanner image processing unit that processes the first image generated by the scanner imaging part to generate first measurement information, and a plurality of self-luminous markers;
an imaging unit including a movable imaging part that moves a field of view to make the three-dimensional scanner be within the field of view, and captures the self-luminous markers for measuring a position and a posture of the three-dimensional scanner to generate a second image including the self-luminous markers, and a camera image processing unit that processes the second image generated by the movable imaging part to generate second measurement information;
a synchronization mechanism that generates identification information for identifying a synchronous execution timing based on a measurement instruction;
a measurement control part that synchronizes the emission of the pattern light from the scanner light source, the imaging by the scanner imaging part, light emission of the self-luminous markers, and the imaging by the movable imaging part in response to the generation of the identification information by the synchronization mechanism; and
a three-dimensional data generation mechanism that generates a point cloud indicating the three-dimensional shape of the measurement target based on the first measurement information generated by the scanner image processing unit and the second measurement information generated by the camera image processing unit,
wherein the three-dimensional scanner further includes a first transmission unit that transmits the first measurement information generated by the scanner image processing unit and identification information corresponding to the first measurement information to be tied to each other, and a first storage unit that stores arrangement information of each of the plurality of self-luminous markers,
the camera image processing unit generates the center position information of each of the self-luminous markers as the second measurement information by performing a process of extracting a center of each of the self-luminous markers on the second image based on the arrangement information of each of the plurality of self-luminous markers stored in the first storage unit of the three-dimensional scanner and the second image,
the imaging unit further includes a second transmission unit that transmits the second measurement information generated by the camera image processing unit and identification information corresponding to the second measurement information to be tied to each other, and
the three-dimensional data generation mechanism receives the first measurement information generated by the scanner image processing unit, the identification information corresponding to the first measurement information, the second measurement information generated by the camera image processing unit, and the identification information corresponding to the second measurement information, and generates the point cloud indicating the three-dimensional shape of the measurement target based on the received first measurement information, identification information corresponding to the first measurement information, second measurement information, and identification information corresponding to the second measurement information.

2. The three-dimensional measurement device according to claim 1, wherein
the imaging unit further includes a fixed imaging part that captures the movable imaging part, and
the measurement control part synchronizes the imaging by the fixed imaging part with the imaging by the movable imaging part in response to generation of the identification information by the synchronization mechanism.

3. The three-dimensional measurement device according to claim 2, wherein
the movable imaging part is provided with a plurality of markers moving as the field of view of the movable imaging part is moved,
the fixed imaging part captures images of the plurality of markers provided in the movable imaging part to generate a third image including the markers,
the camera image processing unit processes the third image generated by the fixed imaging part to generate third measurement information,
the second transmission unit transmits the third measurement information generated by the camera image processing unit and identification information corresponding to the third measurement information to be tied to each other, and
the three-dimensional data generation mechanism generates the point cloud indicating the three-dimensional shape of the measurement target based on the first measurement information generated by the scanner image processing unit, the second measurement information generated by the camera image processing unit, and the third measurement information generated by the camera image processing unit.

4. The three-dimensional measurement device according to claim 3, wherein
the scanner image processing unit generates the first measurement information with the scanner imaging part as a reference,
the first transmission unit transmits the first measurement information with the scanner imaging part as the reference and the identification information corresponding to the first measurement information,
the camera image processing unit generates the second measurement information with the movable imaging part as a reference and the third measurement information with the fixed imaging part as a reference,
the second transmission unit transmits the first measurement information with the scanner imaging part as the reference and the identification information corresponding to the first measurement information, the first measurement information and the identification information being transmitted by the first transmission unit, and the second measurement information with the movable imaging part as the reference and the identification information corresponding to the second measurement information and the third measurement information with the fixed imaging part as the reference and the identification information corresponding to the third measurement information, the second measurement information and the third measurement information being generated by the camera image processing unit, and the three-dimensional data generation mechanism generates the point cloud indicating the three-dimensional shape of the measurement target with the fixed imaging part as a reference based on the first measurement information with the scanner imaging part as the reference, the second measurement information with the movable imaging part as the reference, and the third measurement information with the fixed imaging part as the reference.

5. The three-dimensional measurement device according to claim 1, wherein the scanner image processing unit performs edge extraction processing on the first image to generate edge data as the first measurement information.

6. The three-dimensional measurement device according to claim 1, wherein the first storage unit further stores calibration data of the three-dimensional scanner, and the three-dimensional data generation mechanism generates a point cloud indicating a three-dimensional shape of a measurement target based on calibration data stored in a first storage unit of the three-dimensional scanner, the first measurement information, and the second measurement information.

7. The three-dimensional measurement device according to claim 1, wherein the camera image processing unit performs processing of extracting a center of each of the self-luminous markers on the second image to generate position and posture information of each of the self-luminous markers with respect to the movable imaging part as the second measurement information based on center position information of each of the self-luminous markers obtained by the processing.

8. The three-dimensional measurement device according to claim 1, wherein the camera image processing unit includes an image processing circuit.

9. The three-dimensional measurement device according to claim 1, further comprising:

a memory that sequentially accumulate the first measurement information generated by the scanner image processing unit; and an association unit that associates the first measurement information and the second measurement information based on the identification information, wherein the association unit specifies the first measurement information having the identification information tied to the second measurement information from among a plurality of pieces of the first measurement information accumulated in the memory, and associates the specified first measurement information with the second measurement information.

10. The three-dimensional measurement device according to claim 9, wherein the memory is provided in the imaging unit and sequentially accumulates the first measurement information transmitted from the first transmission unit, and the second transmission unit transmits the first measurement information and the second measurement information associated by the association unit to the three-dimensional data generation mechanism.

11. The three-dimensional measurement device according to claim 1, wherein the scanner light source emits multi-line light as the pattern light, the scanner imaging part generates a multi-line image as the first image, and the scanner image processing unit processes the multi-line image to generate edge data as the first measurement information.

* * * * *